US012525718B2

(12) United States Patent
Wang et al.

(10) Patent No.: US 12,525,718 B2
(45) Date of Patent: Jan. 13, 2026

(54) FILTERING ANTENNA AND ELECTRONIC DEVICE

(71) Applicants: Beijing BOE Technology Development Co., Ltd., Beijing (CN); BOE Technology Group Co., Ltd., Beijing (CN)

(72) Inventors: Yali Wang, Beijing (CN); Xichao Fan, Beijing (CN)

(73) Assignees: BEIJING BOE TECHNOLOGY DEVELOPMENT CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 99 days.

(21) Appl. No.: 18/636,551

(22) Filed: Apr. 16, 2024

(65) Prior Publication Data

US 2024/0347914 A1 Oct. 17, 2024

Related U.S. Application Data

(63) Continuation of application No. PCT/CN2023/088484, filed on Apr. 14, 2023.

(51) Int. Cl.
*H01Q 9/04* (2006.01)
*H01Q 1/22* (2006.01)

(52) U.S. Cl.
CPC ......... *H01Q 9/0457* (2013.01); *H01Q 1/2283* (2013.01)

(58) Field of Classification Search
CPC .. H01Q 9/0414; H01Q 9/0457; H01Q 1/2283; H01Q 13/08
See application file for complete search history.

(56) References Cited

U.S. PATENT DOCUMENTS

2017/0294717 A1 10/2017 Zhang et al.
2021/0249775 A1* 8/2021 Thyagaranjan .......... H01Q 5/15

FOREIGN PATENT DOCUMENTS

CN 111293413 A 6/2020
CN 110600875 B 2/2021
CN 113381175 A 9/2021
CN 215989232 U * 3/2022
CN 115603043 A 1/2023
JP 2012-239144 A 12/2012

OTHER PUBLICATIONS

Written Opinion mailed on Dec. 11, 2023, in corresponding PCT/CN2023/088484, 5 pages.

* cited by examiner

*Primary Examiner* — Daniel Munoz
(74) *Attorney, Agent, or Firm* — XSENSUS LLP

(57) ABSTRACT

The present disclosure provides a filtering antenna. The filtering antenna includes: a ground layer, a first dielectric layer, a second dielectric layer and a radiating patch and a coupling probe. The coupling probe includes a microstrip line sandwiched between the first and second dielectric layers, and includes a feeder that penetrates the first dielectric layer. The microstrip line includes a trunk line and an open-circuit branch line connected to the trunk line. A distance between a feed center of the microstrip line and a first end of the trunk line is D1, and a distance between an orthographic projection of the first end of the trunk line on the second dielectric layer and an orthographic projection of an edge of the radiating patch on the second dielectric layer is D4, where 2.5≤D1/D4≤3.0.

20 Claims, 25 Drawing Sheets

FILTERING ANTENNA AND ELECTRONIC DEVICE

CROSS-REFERENCE TO RELATED APPLICATION

The present application is a continuation of International Application No. PCT/CN2023/088484, filed on Apr. 14, 2023, the contents of which are incorporated herein by reference in its entirety for all purposes.

TECHNICAL FIELD

The present disclosure relates to the field of antenna technologies, and in particular, to a filtering antenna and an electronic device.

BACKGROUND

With the developments in the Internet of Things era and 5G mobile communications, wireless communication technologies and wireless smart devices are constantly iteratively updated, which has rapidly improved people's quality of life. As a result, the complexity of modern wireless communication systems has increased dramatically, and it is needed to be able to support wireless communication systems with multiple frequencies and multiple standards. As to a radio frequency front-end of a communication system, the main research focuses on devices and antennas with adjustable frequency and fusion of multiple functions, which has very important practical significance for the developments of wireless communication systems.

Antenna-filter fusion design has been a hot research area in recent years. Filtering antenna is a form of antenna that can achieve radiation and filtering functions. Common design methods include lading open/short circuit branch(es), etching slot(s), loading parasitic structure(s), and adding metal probe(s), etc. There are no filter circuits and matching circuits in the fusion design solution, the structure of the filtering antenna is more compact, and the loss of the antenna itself is smaller. The filtering antenna based on patch antenna design has the advantages of compact structure, simplicity in design, and low cost.

It should be noted that the information disclosed in the above background section is only used to enhance understanding of the background of the present disclosure, and therefore may include information that does not constitute prior art known to those of ordinary skill in the art.

SUMMARY

The purpose of the present disclosure is to overcome the above-mentioned shortcomings of related art and provide a filtering antenna and an electronic device that simultaneously realize radiation and filtering functions.

According to an aspect of the present disclosure, there is provided a filtering antenna. The filtering antenna includes: a ground layer, a first dielectric layer, a second dielectric layer and a radiating patch that are stacked in sequence; and a coupling probe. The coupling probe includes: a microstrip line sandwiched between the first dielectric layer and the second dielectric layer; and a feeder that penetrates the first dielectric layer. The microstrip line includes a trunk line extending along a first direction and an open-circuit branch line connected to the trunk line. The feeder is electrically connected to the trunk line. A distance between a feed center of the microstrip line and a first end of the trunk line is D1; a distance between an orthographic projection of the first end of the trunk line on the second dielectric layer and an orthographic projection of an edge of the radiating patch on the second dielectric layer is D4; 2.5≤D1/D4≤3.0.

According to an implementation of the present disclosure, a width of the trunk line is greater than a width of the open-circuit branch line.

According to an implementation of the present disclosure, the trunk line has a first axis of symmetry along the first direction, and the radiating patch has a second axis of symmetry along the first direction;

wherein an orthographic projection of the first axis of symmetry on the radiating patch coincides with the second axis of symmetry.

According to an implementation of the present disclosure, the orthographic projection of the first end of the trunk line on the second dielectric layer is located within an orthographic projection of the radiating patch on the second dielectric layer.

According to an implementation of the present disclosure, a distance between an orthographic projection of a second end of the trunk line on the second dielectric layer and an orthographic projection of an edge of the radiating patch on the second dielectric layer is D5;

wherein D4<D5.

According to an implementation of the present disclosure, a radius of the feeder is 0.35~0.45 millimeters.

According to an implementation of the present disclosure, the radiating patch is square and has a side length of 13~17 millimeters.

According to an implementation of the present disclosure, a length of the trunk line is 15~17 millimeters.

According to an implementation of the present disclosure, the open-circuit branch line includes a first branch line extending along the first direction and a second branch line extending along the second direction, and the second direction is perpendicular to the first direction;

wherein a first end of the second branch line is connected to the trunk line, and a second end of the second branch line is connected to a first end of the first branch line, and a second end of the first branch line is located at a side of the second branch line close to the first end of the trunk line;

wherein a length of the trunk line is L1, and a length of the first branch line is L2;

wherein 2.0≤L1/L2≤2.4.

According to an implementation of the present disclosure, the second branch line has a first edge of the second branch line and a second edge of the second branch line that are oppositely arranged;

wherein in the first direction, the first edge of the second branch line is located at a side of the second edge of the second branch line close to the feed center;

wherein a distance between the feed center and a straight line where the first edge of the second branch line is located is D3, and a distance between a second end of the trunk line and the straight line where the first edge of the second branch line is located is X1;

wherein D3 and X1 are basically equal.

According to an implementation of the present disclosure, the second end of the first branch line is located between the feed center and the first end of the trunk line in the first direction.

According to an implementation of the present disclosure, in the first direction, a distance between the feed center and the second end of the first branch line is D2;

wherein D2<D3.

According to an implementation of the present disclosure, a distance between the trunk line and the first branch line is X2;

wherein X2 is smaller than D1.

According to an implementation of the present disclosure, the open-circuit branch line further includes a third branch line;

wherein the third branch line and the first branch line extend in a same direction and are respectively arranged at both sides of the second branch line;

wherein a first end of the third branch line is connected to the second end of the second branch line;

wherein an orthographic projection of a second end of the third branch line on the second dielectric layer is located within an orthographic projection of the radiating patch on the second dielectric layer.

According to an implementation of the present disclosure, a length of the third branch line is L2x;

wherein a distance between the orthographic projection of the second end of the third branch line on the second dielectric layer and the orthographic projection of an edge of the radiating patch on the second dielectric layer is X3;

wherein X3<L2x.

According to an implementation of the present disclosure, the open-circuit branch line further includes a fifth branch line extending along the second direction and a fourth branch line extending along the first direction;

wherein the fourth branch line and the first branch line are respectively located at both sides of the trunk line;

wherein a first end of the fifth branch line is connected to the trunk line, and a second end of the fifth branch line is connected to a first end of the fourth branch line;

wherein a second end of the fourth branch line is located at a side of the first end of the fourth branch line close to the feed center.

According to an implementation of the present disclosure, a center line of the fifth branch line and a center line of the second branch line are located on a same straight line.

According to an implementation of the present disclosure, a distance between the fourth branch line and the trunk line is X4, and a distance between the first branch line and the trunk line is X2;

wherein X2 and X4 are basically equal.

According to an implementation of the present disclosure, a length of the first branch line is L2, and a length of the fourth branch line is L4;

wherein L 4<L2.

According to an implementation of the present disclosure, the open-circuit branch line further includes a fifth branch line extending along the second direction and a fourth branch line extending along the first direction, and the four branch line and the first branch line are respectively located at both sides of the trunk line;

wherein a first end of the fifth branch line is connected to the trunk line, and a second end of the fifth branch line is connected to a first end of the fourth branch line;

wherein a second end of the fourth branch line is located at a side of the first end of the fourth branch line away from the feed center.

According to an implementation of the present disclosure, a center line of the fifth branch line and a center line of the second branch line are located on a same straight line.

According to an implementation of the present disclosure, a distance between the fourth branch line and the trunk line is X4, and a distance between the first branch line and the trunk line is X2;

wherein X2 and X4 are basically equal.

According to an implementation of the present disclosure, an orthographic projection of the second end of the fourth branch line on the second dielectric layer is located within an orthographic projection of the radiating patch on the second dielectric layer, and a length of the fourth branch line is L4;

wherein a distance between the orthographic projection of the second end of the fourth branch line on the second dielectric layer and an orthographic projection of an edge of the radiating patch on the second dielectric layer is X5;

wherein X5<L4.

According to an implementation of the present disclosure, the microstrip line further includes a sixth branch line extending along the first direction, and the sixth branch line and the open-circuit branch line are respectively located at both sides of the trunk line.

According to an implementation of the present disclosure, the sixth branch line has a first end and a second end;

wherein the first end of the sixth branch line is close to the first end of the trunk line, and the second end of the sixth branch line is close to the second end of the trunk line;

wherein in the first direction, a distance between the first end of the sixth branch line and the feed center is D6;

wherein D6<D1.

According to an implementation of the present disclosure, a distance between the sixth branch line and the trunk line is D7;

wherein D7 is not larger than a radius of the feeder.

According to an implementation of the present disclosure, a length of the sixth branch line is L6, and a length of the trunk line is L1;

wherein L6<L1.

According to an implementation of the present disclosure, the microstrip line further includes a seventh branch line extending along the second direction;

wherein a first end of the seventh branch line is connected to the sixth branch line, and an orthographic projection of a second end of the seventh branch line on the second dielectric layer is located outside an orthographic projection of the radiating patch on the second dielectric layer.

According to an implementation of the present disclosure, the seventh branch line has a first edge and a second edge arranged oppositely;

wherein in the first direction, the first edge of the seventh branch line is located at a side of the second edge close to the feed center;

wherein the sixth branch line has a first end and a second end;

wherein the first end of the sixth branch line is close to the first end of the trunk line, and the second end of the sixth branch line is close to the second end of the trunk line;

wherein a distance between the first end of the sixth branch line and the first edge of the seventh branch line is X6, and a distance between the second end of the sixth branch line and the first edge of the lines is X7;

wherein X6 and X7 are basically equal.

According to an implementation of the present disclosure, the sixth branch line has a first end and a second end;

wherein the first end of the sixth branch line is close to the first end of the trunk line, and the second end of the sixth branch line is close to the second end of the trunk line;

wherein an orthographic projection of the second end of the sixth branch line and an orthographic projection of the second end of the trunk line on the second dielectric layer are both located outside an orthographic projection of the radiating patch on the second dielectric layer;

wherein a distance between the orthographic projection of the second end of the sixth branch line on the second dielectric layer and an orthographic projection of an edge of the radiating patch on the second dielectric layer is D9;

wherein a distance between the orthographic projection of the second end of the trunk line on the second dielectric layer and the orthographic projection of the edge of the radiating patch on the second dielectric layer is D5;

wherein D9>D5.

According to another aspect of the present disclosure, there is provided an electronic device, including the filtering antenna described above.

It should be understood that the foregoing general description and the following detailed description are illustrative and explanatory only, and are not intended to limit the present disclosure.

BRIEF DESCRIPTION OF THE DRAWINGS

The accompanying drawings, which are incorporated in and constitute a part of the specification, illustrate embodiments consistent with the present disclosure and together with the specification, serve to explain the principles of the present disclosure. Obviously, the drawings in the following description are only some embodiments of the present disclosure. For those of ordinary skill in the art, other drawings can be obtained based on these drawings without exerting creative efforts.

FIG. 4-1 is a surface current distribution diagram of a radiating patch at a low-frequency radiation zero in the first verification example of the present disclosure.

FIG. 4-2 is a surface current distribution diagram of a radiating patch at a high-frequency radiation zero in the first verification example of the present disclosure.

FIG. 5-1 is a surface current distribution diagram of a coupling probe at a low-frequency radiation zero in the first verification example of the present disclosure.

FIG. 5-2 is a surface current distribution diagram of a coupling probe at a high-frequency radiation zero in the first verification example of the present disclosure.

FIG. 8-1 is a surface current distribution diagram of a radiating patch at a low-frequency radiation zero in the second verification example of the present disclosure.

FIG. 8-2 is a surface current distribution diagram of a radiating patch at a high-frequency radiation zero in the second verification example of the present disclosure.

FIG. 9-1 is a surface current distribution diagram of a coupling probe at a low-frequency radiation zero in the second verification example of the present disclosure.

FIG. 9-2 is a surface current distribution diagram of a coupling probe at a high-frequency radiation zero in the second verification example of the present disclosure.

FIG. 12-1 is a surface current distribution diagram of a radiating patch at a low-frequency radiation zero in the third verification example of the present disclosure.

FIG. 12-2 is a surface current distribution diagram of a radiating patch at a high-frequency radiation zero in the third verification example of the present disclosure.

FIG. 13-1 is a surface current distribution diagram of a coupling probe at a low-frequency radiation zero in the third verification example of the present disclosure.

FIG. 13-2 is a surface current distribution diagram of a coupling probe at a high-frequency radiation zero in the third verification example of the present disclosure.

FIG. 16-1 is a surface current distribution diagram of a radiating patch at a low-frequency radiation zero in the fourth verification example of the present disclosure.

FIG. 16-2 is a surface current distribution diagram of a radiating patch at a high-frequency radiation zero in the fourth verification example of the present disclosure.

FIG. 17-1 is a surface current distribution diagram of a coupling probe at a low-frequency radiation zero in the fourth verification example of the present disclosure.

FIG. 17-2 is a surface current distribution diagram of a coupling probe at a high-frequency radiation zero in the fourth verification example of the present disclosure.

FIG. 20-1 is a surface current distribution diagram of a radiating patch at a low-frequency radiation zero in the fifth verification example of the present disclosure.

FIG. 20-2 is a surface current distribution diagram of a radiating patch at a high-frequency radiation zero in the fifth verification example of the present disclosure.

FIG. 21-1 is a surface current distribution diagram of a coupling probe at a low-frequency radiation zero in the fifth verification example of the present disclosure.

FIG. 21-2 is a surface current distribution diagram of a coupling probe at a high-frequency radiation zero in the fifth verification example of the present disclosure.

FIG. 24-1 is a surface current distribution diagram of a radiating patch at a low-frequency radiation zero in the sixth verification example of the present disclosure.

FIG. 24-2 is a surface current distribution diagram of a radiating patch at a high-frequency radiation zero in the sixth verification example of the present disclosure.

FIG. 25-1 is a surface current distribution diagram of a coupling probe at a low-frequency radiation zero in the sixth verification example of the present disclosure.

FIG. 25-2 is a surface current distribution diagram of a coupling probe at the high-frequency radiation zero in the sixth verification example of the present disclosure.

DETAILED DESCRIPTION

Figure 1:
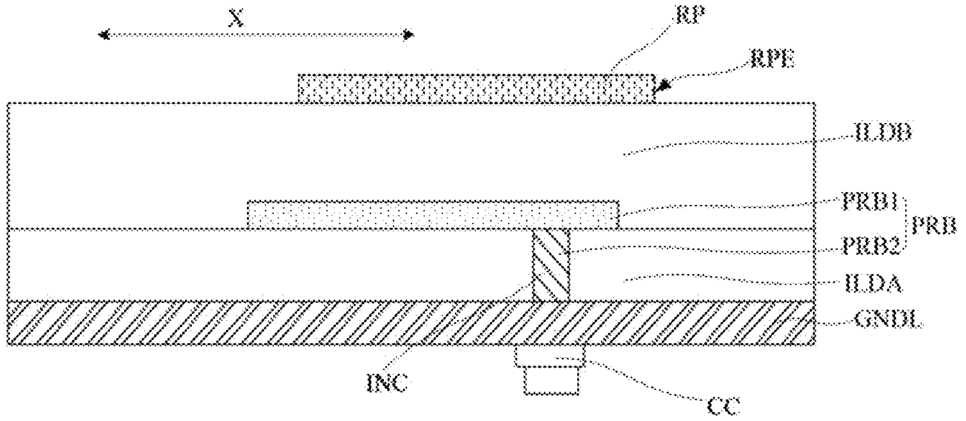
FIG. 1 is a schematic diagram of a stacked structure of a filtering antenna in an implementation of the present disclosure.

Example implementations will now be described more fully with reference to the accompanying drawings. Example implementations may, however, be embodied in many forms and should not be construed as being limited to the implementations set forth herein; rather, these implementations are provided so that the present disclosure will be thorough and complete, and will fully convey the concept of example implementations to those skilled in the art. The same reference numerals in the drawings indicate the same or similar structures, and thus their detailed descriptions will be omitted. Furthermore, the drawings are merely schematic illustrations of the present disclosure and are not necessarily drawn to scale.

Although relative terms such as "upper" and "lower" are used in the specification to describe a relative relationship of one component shown in a drawing to another component, these terms are used in the specification only for convenience. For example, the terms are based on directions of examples described in the drawings. It will be understood that if a device shown in a drawing is turned upside down, a component described as "upper" would become a components which is "lower". When a structure is "on" other structure, it may mean that the structure is integrally formed on other structure, or that the structure is "directly" arranged on other structure, or that the structure is "indirectly" arranged on other structure through another structure.

The words "one", "a/an", "the", "said" and "at least one" are used in the specification to indicate the presence of one or more elements/components/etc.; the terms "comprising/comprises/comprise" and "having/has/have" are used to indicate an open-ended inclusive, and means that there may be additional elements/components/etc. in addition to the listed elements/components/etc. The words "first", "second" and "third" are used as markers only, but are not used to limit the number of objects.

An implementation of the present disclosure provides a filtering antenna. Referring to FIG. 1, the filtering antenna includes a ground layer GNDL, a first dielectric layer ILDA, a second dielectric layer ILDB and a radiating patch RP that are stacked in sequence, and includes a coupling probe PRB. The coupling probe PRB includes a microstrip line PRB1 sandwiched between the first dielectric layer ILDA and the second dielectric layer ILDB, and includes a feeder PRB2 that penetrates the first dielectric layer ILDA. Referring to FIGS. 2, 6, 10, 14, 18 and 22, the microstrip line PRB1 includes a trunk line PA extending along a first direction X and an open-circuit branch line connected to the trunk line PA. The microstrip line PRB1 and the feeder PRB2 of the present disclosure form an L probe, which transmits energy to the radiating patch RP of the antenna through proximity coupling.

Therefore, the filtering antenna provided by the implementation of the present disclosure is a patch antenna which is fed by a coupling probe, and the filtering antenna has a low profile characteristic. The filtering antenna is fed in the form of back feeding, and thus the filtering antenna has a compact structure. Also, the filtering antenna is a patch antenna, which has the advantages of simple structure, convenience in manufacturing, and low cost.

At a circuit level, the radiating patch RP itself may be equivalent to a first inductor and a first capacitor; the coupling probe PRB introduces an additional second inductor, and the coupling between the microstrip line PRB1 and the radiating patch RP generates an additional second capacitor. The first inductor and the first capacitor introduce a transmission pole, causing the filtering antenna to resonate; the second inductor and the second capacitor introduce a transmission zero, which corresponds to the antenna structure to cause the antenna to generate a radiation zero.

Referring to FIGS. 2, 6, 10, 14, 18 and 22, the distance between a feed center of the microstrip line PRB1 and a first end of the trunk line PA is D1; and the distance between an orthographic projection of the first end of trunk line PA on the second dielectric layer ILDB and an orthographic projection of an edge RPE of the radiating patch on the second dielectric layer ILDB is D4;

where $2.5 \leq D1/D4 \leq 3.0$. In this way, the antenna can achieve better impedance matching.

In an implementation of the present disclosure, an extension direction of the trunk line PA is a first direction X, and a direction perpendicular to the trunk line PA and parallel to a plane where the ground layer GNDL is located may be defined as a second direction Y. In this way, the first direction X, the second direction Y, and a normal direction of the filtering antenna are perpendicular to each other.

In an implementation of the present disclosure, the feed center is not arranged at the center or end of the trunk line PA, but is arranged close to the first end of the trunk line PA with certain spacing from the first end of the trunk line PA. This is conducive to the introduction of a new resonance mode or impedance matching, which is conducive to optimizing the performance of the filtering antenna and improving the compactness of the filtering antenna. Further, the trunk line PA can also introduce a high-frequency radiation zero on the right side of the pass-band. The high-frequency radiation zero of the filtering antenna is affected by the distance D4 in the first direction X between the first end of the trunk line PA and the edge RPE of the radiating patch and the length of the trunk line PA. In the implementation of the present disclosure, $2.5 \leq D1/D4 \leq 3.0$; on the one hand, this can better achieve impedance matching, and on the other hand, it is also conducive to adjusting and optimizing the filtering performance of the filtering antenna.

In an implementation of the present disclosure, the introduction of the open-circuit branch line can introduce a low-frequency radiation zero on the left side of the pass-band. In one example, the open-circuit branch line may include a section of open-circuit transmission line, and the total length of the open-circuit transmission line is approximately one quarter of a propagation wavelength corresponding to the low-frequency radiation zero. For example, a first branch line PB and a second branch line PC in FIG. 2 may be used as a bent open-circuit transmission line. Of course, it is understandable that the open-circuit branch line may also include other open-circuit structure(s) to adjust parameters such as impedance, low-frequency radiation zero, gain within the pass-band, pass-band flatness, sideband selectivity and so on.

Further, in the implementation of the present disclosure, whether it is the position of the feed center or the shape of the microstrip line PRB1 can adjust the resonance mode in the filtering antenna or introduce a new resonance mode, thereby making the filtering antenna have wide bandwidth and good impedance matching.

The filtering antenna provided by the implementation of the present disclosure is easy to manufacture due to its simple structural design. For example, the filtering antenna can be prepared using a conventional PCB manufacturing technology. The filtering antenna can realize the antenna function and the filtering function, and thus when the filtering antenna is applied to an antenna array, it is possible to reduce inter-frequency coupling between antenna units in different frequency bands and close distance.

In some implementations of the present disclosure, the feeder PRB2 may be a metallized via hole penetrating the first dielectric layer ILDA. In other implementations, the feeder PRB2 may be an inner conductor of a coaxial probe penetrating the first dielectric layer ILDA. Of course, the feeder PRB2 can also employ other conductive structures and forms.

As follows, the structures, principles and effects of the filtering antenna according to implementations of the present disclosure will be further explained and described with reference to the accompanying drawings.

Figure 2:
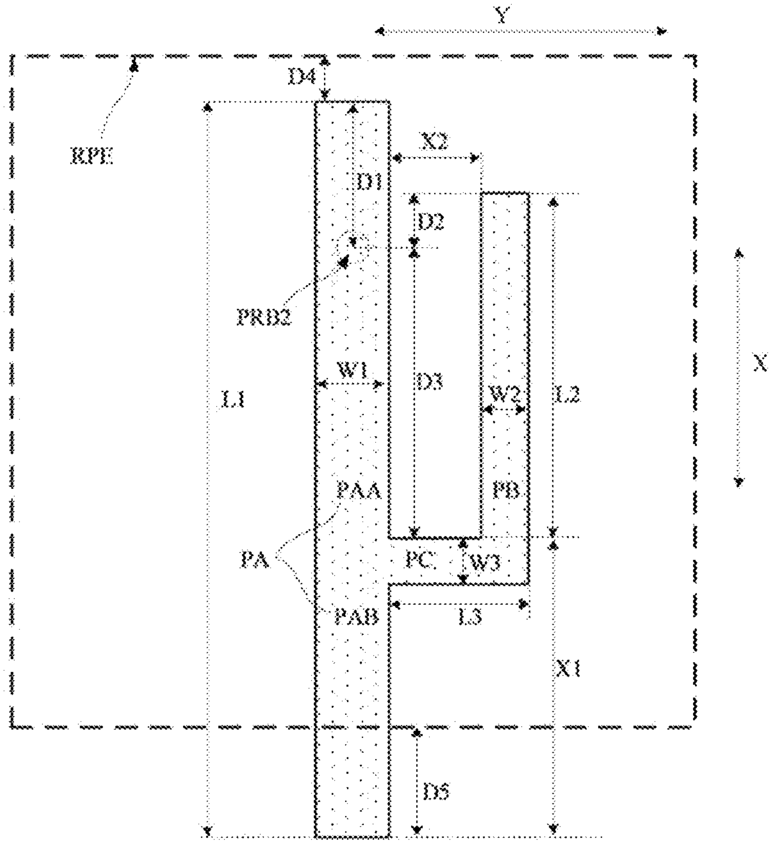
FIG. 2 is a schematic top view of a structure of a coupling probe in a first embodiment of the present disclosure.
Figure 6:
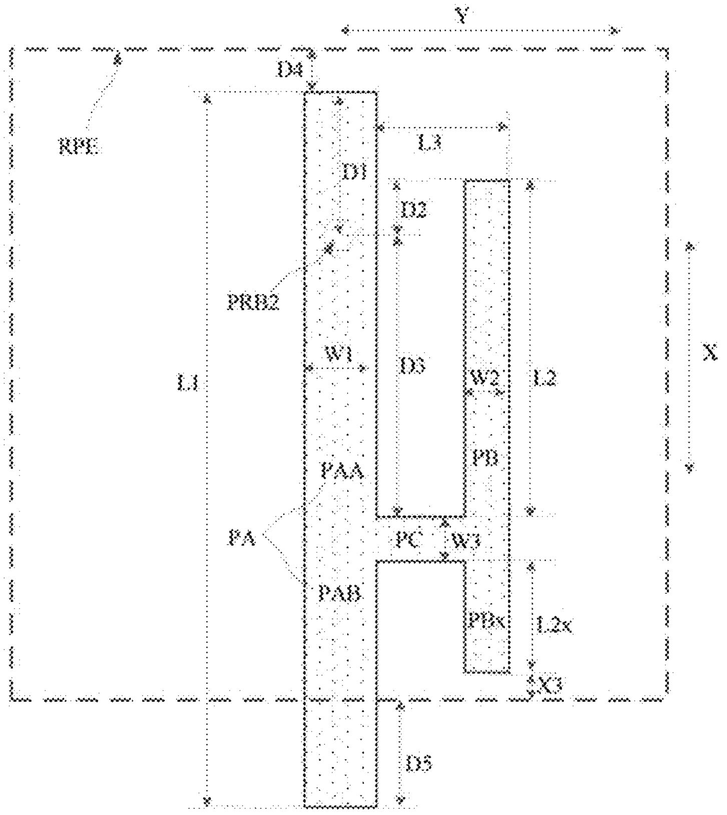
FIG. 6 is a schematic top view of a structure of a coupling probe in a second embodiment of the present disclosure.
Figure 10:
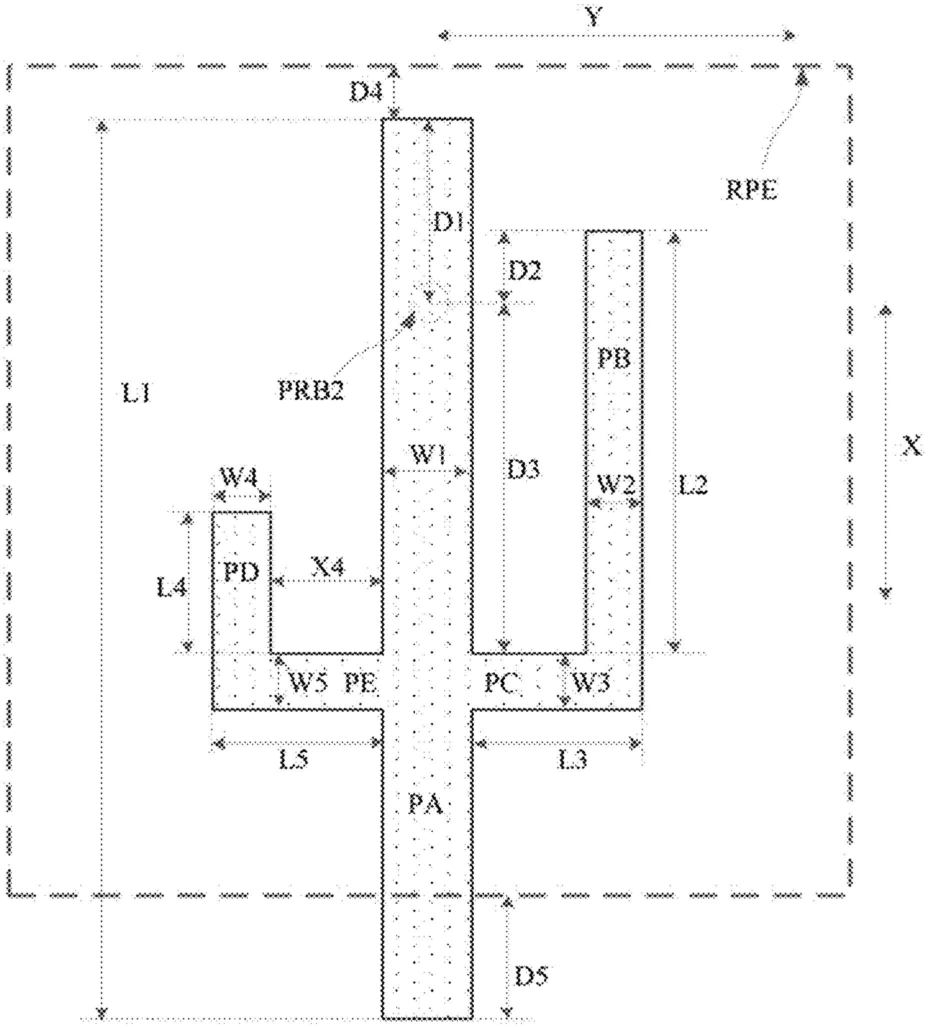
FIG. 10 is a schematic top view of a structure of a coupling probe in a third embodiment of the present disclosure.
Figure 14:
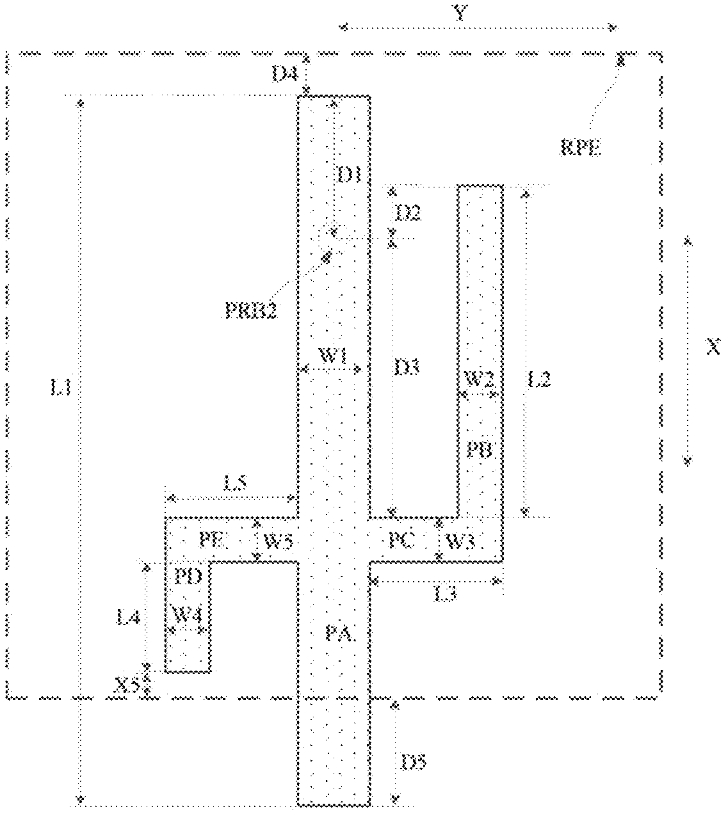
FIG. 14 is a schematic top view of a structure of a coupling probe in a fourth embodiment of the present disclosure.
Figure 18:
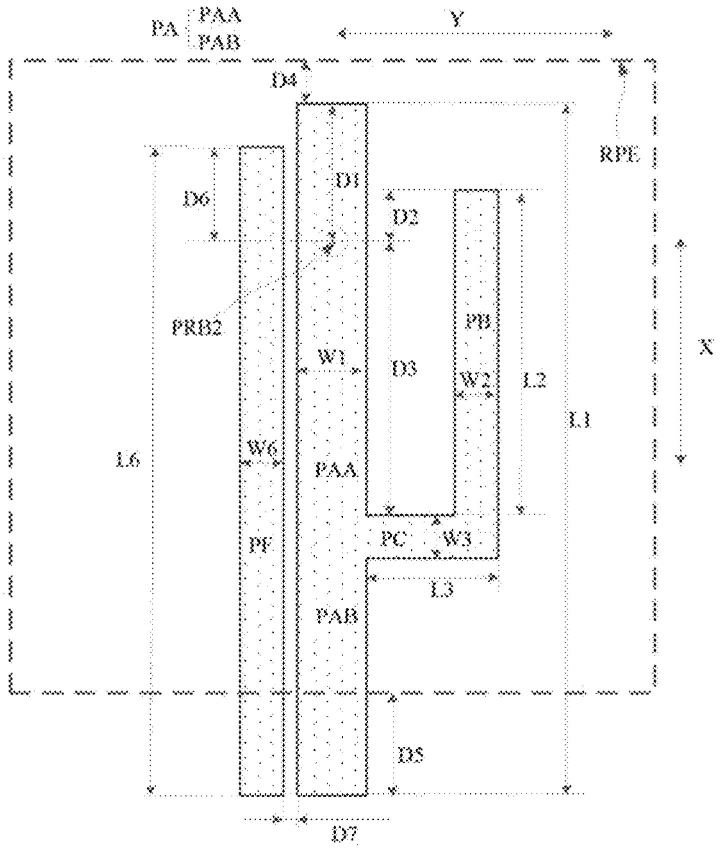
FIG. 18 is a schematic top view of a structure of a coupling probe in a fifth embodiment of the present disclosure.
Figure 22:
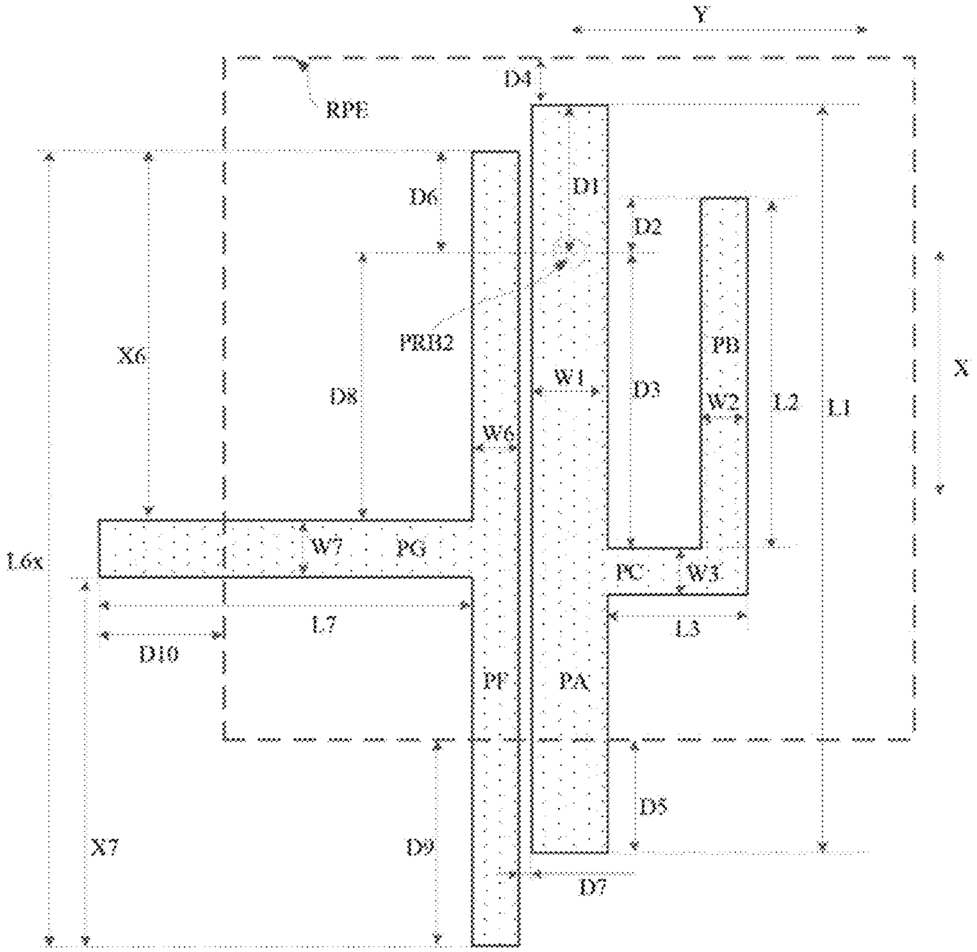
FIG. 22 is a schematic top view of a structure of a coupling probe in a sixth embodiment of the present disclosure.

FIG. 2 illustrates a schematic top view of a coupling probe PRB in a first embodiment of the present disclosure. FIG. 6 illustrates a schematic top view of a coupling probe PRB in a second embodiment of the present disclosure. FIG. 10 illustrates a schematic top view of a coupling probe PRB in a third embodiment of the present disclosure. FIG. 14 illustrates a schematic top view of a coupling probe PRB in a fourth embodiment of the present disclosure. FIG. 18 illustrates a schematic top view of a coupling probe PRB in a fifth embodiment of the present disclosure. FIG. 22 illustrates a schematic top view of a coupling probe PRB in a sixth embodiment of the present disclosure. It can be understood that the coupling probe PRB in the filtering antenna according to the implementations of the present disclosure is not limited to the six forms illustrated in FIGS. 2, 6, 10, 14, 18 and 22.

In an implementation of the present disclosure, the distance between the feed center and the first end of the trunk line PA is D1, and the length of the trunk line PA is L1, where $0.15 \le D1/L1 \le 0.2$.

Referring to FIGS. 2, 6, 10, 14, 18 and 22, in some implementations of the present disclosure, the width W1 of the trunk line PA is greater than the width of the open-circuit branch line. In this way, the antenna can achieve better impedance matching.

Referring to FIGS. 2, 6, 10, 14, 18 and 22, in some implementations of the present disclosure, the trunk line PA has a first axis of symmetry along the first direction X; the radiating patch RP has a second axis of symmetry along the first direction X; an orthographic projection of the first axis of symmetry on the radiating patch RP coincides with the second axis of symmetry.

Referring to FIGS. 2, 6, 10, 14, 18 and 22, in some implementations of the present disclosure, the orthographic projection of the first end of the trunk line PA on the second dielectric layer ILDB is located within the orthographic projection range of the radiating patch RP on the second dielectric layer ILDB.

Referring to FIGS. 2, 6, 10, 14, 18 and 22, in some implementations of the present disclosure, an orthographic projection of a first end of the first branch line PB on the second dielectric layer ILDB is located outside the orthographic projection range of the radiating patch RP on the second dielectric layer ILDB.

Referring to FIGS. 2, 6, 10, 14, 18 and 22, in some implementations of the present disclosure, the distance between the orthographic projection of the first end of the trunk line PA on the second dielectric layer ILDB and the orthographic projection of the edge RPE (i.e., the upper edge) of the radiating patch on the second dielectric layer ILDB is D4, and the distance between an orthographic projection of a second end of the trunk line PA on the second dielectric layer ILDB and the orthographic projection of the edge RPE (i.e., the lower edge) of the radiating patch on the second dielectric layer ILDB is D5, where $D4 < D5$, and further, $0.45 \le D4/D5 \le 0.6$.

In this way, along the first direction X, the length of the trunk line PA is greater than the length of the radiating patch RP. The first end of the trunk line PA is within the coverage range of the radiating patch RP, and the second end of the trunk line PA is outside the coverage range of the radiating patch RP. By setting D4 and D5, the filtering antenna can have a suitable high-frequency radiation zero.

Referring to FIGS. 2, 6, 10, 14, 18 and 22, in some implementations of the present disclosure, the radius of the feeder PRB2 is 0.35~0.45 millimeters. In one example, the inner conductor INC of the coaxial probe serves as the feeder PRB2, and the radius of the inner conductor INC of the coaxial probe is 0.4 millimeters. In this way, the antenna can achieve better impedance matching.

In some implementations of the present disclosure, the radius of the outer conductor of the coaxial probe CC may be 0.6~1.2 millimeters. For example, the radius of the outer conductor may be 0.92 millimeters.

Referring to FIGS. 2, 6, 10, 14, 18 and 22, in some implementations of the present disclosure, the radiating patch RP is square in shape with a side length of 13~17 millimeters. In this way, the central operating frequency of the filtering antenna is around 3.5 GH. Further, the radiating patch RP is square in shape, with a side length of 15 millimeters.

In some implementations of the present disclosure, the ground layer GNDL is square in shape with a side length of 35~45 millimeters. For example, the side length of the ground layer GNDL is 40 millimeters. The size of the first dielectric layer ILDA and the size of the second dielectric layer ILDB may not be smaller than the size of the ground layer GNDL. For example, the edges of the first dielectric layer ILDA and the second dielectric layer ILDB are flush with the ground layer GNDL, or exceed the edge of the ground layer GNDL by 1~2 millimeters.

In one example, the central axis of the ground layer GNDL coincides with the central axis of the radiating patch RP.

Referring to FIGS. 2, 6, 10, 14, 18 and 22, in some implementations of the present disclosure, the length of the trunk line PA is 15~17 millimeters. For example, the length of the trunk line PA is 16 millimeters.

In some implementations of the present disclosure, the materials of the ground layer GNDL, the radiating patch RP, and the microstrip line PRB1 are metal materials with excellent conductivity, such as copper, gold, aluminum, and so on.

In some implementations of the present disclosure, the film thickness of any one of the ground layer GNDL, the radiating patch RP, the microstrip line PRB1, and so on may be relatively small, for example, no more than 50 microns, particularly no more than 20 microns. In one example, the ground layer GNDL, the radiating patch RP, and the microstrip line PRB1 each have a thickness of 17 microns.

In some embodiments of the present disclosure, the second dielectric layer ILDB and the first dielectric layer ILDA may be made of the same material. Of course, the materials of the second dielectric layer ILDB and the first dielectric layer ILDA may also be different.

In some implementations of the present disclosure, the thickness of the first dielectric layer ILDA is greater than the thickness of the second dielectric layer ILDB, and the thicknesses of each of the first dielectric layer ILDA and the second dielectric layer ILDB is 1~4 millimeters. For example, the thickness of the second dielectric layer ILDB is 1~2 millimeters, and the thickness of the first dielectric layer ILDA is 3~4 millimeters. It can be understood that when the material properties of the first dielectric layer ILDA and the second dielectric layer ILDB change, their thicknesses may change.

In some implementations of the present disclosure, the dielectric constant of any one of the first dielectric layer ILDA and the second dielectric layer ILDB is 5~7, so as to facilitate reducing the thicknesses of the first dielectric layer ILDA and the second dielectric layer ILDB. For example, the dielectric constants of the first dielectric layer ILDA and the second dielectric layer ILDB are both 6.15.

In some implementations of the present disclosure, the dielectric loss tangent of any one of the first dielectric layer ILDA and the second dielectric layer ILDB is not greater than 0.003 to reduce energy loss. For example, the dielectric loss tangent of any one of the first dielectric layer ILDA and the second dielectric layer ILDB is 0.002.

In one example, the dielectric constants of the first dielectric layer ILDA and the second dielectric layer ILDB are both 6.15, and the dielectric loss tangents are both 0.002. The thickness of the first dielectric layer ILDA is 3.18 millimeters, and the thickness of the second dielectric layer ILDB is 1.27 millimeters.

In an implementation of the present disclosure, the central operating frequency of the filtering antenna is 3.5 GHz. In one example, the filtering antenna works in the 5G n78 frequency band.

As follows, six embodiments including first to sixth embodiments are taken as examples to further explain and describe the filtering antenna according to implementations of the present disclosure.

First Embodiment

FIG. 2 illustrates a schematic top view of a coupling probe PRB in a first embodiment of the present disclosure. Referring to FIG. 2, the open-circuit branch line includes a first branch line PB and a second branch line PC. The first branch line PB is arranged parallel to the trunk line PA, and an extension direction of the second branch line PC is perpendicular to the trunk line PA, that is, the second branch line PC extends along the second direction Y. A first end of the second branch line PC is connected to the trunk line PA, and a second end of the second branch line PC is connected to a first end of the first branch line PB. A second end of the first branch line PB is located at a side of the second branch line PC close to the first end of the trunk line PA. In this embodiment, the first branch line PB and the second branch line PC together serve as an open-circuit transmission line and can cooperate with the trunk line PA to introduce a low-frequency radiation zero in the pass-band of the filtering antenna. It can be understood that the low-frequency radiation zero can be adjusted by adjusting the total length of the first branch line PB and the second branch line PC.

In an implementation of the present disclosure, the length of the trunk line PA is L1, the length of the first branch line PB is L2, and the length of the second branch line PC is L3. The second branch line PC has a first edge of the second branch line PC and a second edge of the second branch line PC that are oppositely arranged. In the first direction X, the first edge of the second branch line PC is located at a side of the second edge of the second branch line PC close to the feed center. The first branch line PB is located at a side of the first edge of the second branch line PC away from the second edge of the second branch line PC. Therefore, the length of the first branch line PB refers to the distance between the second end of the first branch line PB and a straight line where the first edge of the second branch line PC is located.

In one example, $2.0 \le L1/L2 \le 2.4$.

Optionally, the value of L2+L3 is in a range of 9.5~11.5 millimeters, for example, 10.5 millimeters. In this way, the low-frequency radiation zero is at approximately 2.97 GHz. In one example, L3 is 2.5~3.5 millimeters, and L2 is 7~8 millimeters. For example, L2 is 7.5 millimeters and L3 is 3 millimeters.

In an implementation of the present disclosure, the distance between the feed center and the straight line where the first edge of the second branch line PC is located is D3, and the distance between the second end of the trunk line PA and the straight line where the first edge of the second branch line PC is located is X1. Optionally, D3 and X1 are basically equal, for example, $0.9 \le D3/X1 \le 1.1$, particularly $D3/X1=1$.

Optionally, in the first direction X, the second end of the first branch line PB is located between the feed center and the first end of the trunk line PA.

In the embodiment of the present disclosure, in the first direction X, the distance between the feed center and the second end of the first branch line PB is D2. In one example, $0.3 \le D2/D1 < 0.4$, for example, $D2/D1=0.33$.

Optionally, $D2 < D3$, particularly $0.1 \le D2/D3 \le 0.2$.

In the embodiment of the present disclosure, the distance between the trunk line PA and the first branch line PB is X2. Optionally, $X2 < D1$, particularly $0.5 \le X2/D1 \le 0.75$.

In the embodiment of the present disclosure, the width of the trunk line PA is W1. The width of the first branch line PB is W2. The width of the second branch line PC is W3. Optionally, W1 is 1.2~2.0 millimeters; W2 is 0.8~1.2 millimeters; W3 is 0.8~1.2 millimeters. W2 and W3 are both smaller than W1. Further, W2 and W3 are the same.

In the embodiment of the present disclosure, for the convenience of description, a part of the trunk line PA between the first end of the trunk line PA and the second branch line PC may be called a first section PAA of the trunk line, and a part of the trunk line PA between the second end of the trunk line and the second branch line PC may be called a second section PAB of the trunk line. In this embodiment, through these configurations, the filtering antenna can introduce a new resonance mode to increase bandwidth and achieve better impedance matching. Further, the filtering antenna also introduces a filter response characteristic, and has a compact structure and simple design.

This embodiment also provides a first verification example. In this first verification example, the side length of the ground layer GNDL is 40 millimeters; the dielectric constants of the first dielectric layer ILDA and the second dielectric layer ILDB are both 6.15; the dielectric loss tangents of the first dielectric layer ILDA and the second dielectric layer ILDB are both 0.002; the thickness of the first dielectric layer ILDA is 3.18 millimeters, and the thickness of the second dielectric layer ILDB is 1.27 millimeters; the side length of the radiating patch RP is 15 millimeters; the radiating patch RP, the ground layer GNDL and the microstrip line PRB1 each have a thickness of 17 microns. Other parameters of the filtering antenna in this first verification example are shown in Table 1:

TABLE 1

Relevant parameters of filtering antenna

| parameter | millimeters |
|---|---|
| L1 | 16 |
| L2 | 7.5 |
| L3 | 3 |
| D1 | 3 |
| D2 | 1 |
| D3 | 6.5 |
| D4 | 1.1 |
| D5 | 2.1 |
| W1 | 1.6 |
| W2 | 1.0 |
| W3 | 1.0 |
| X1 | 6.5 |

The present disclosure simulates the first verification example through HFSS software. Simulation results can be seen from FIG. 3, FIG. 4-1, FIG. 4-2, FIG. 5-1, and FIG. 5-2.

Figure 3:
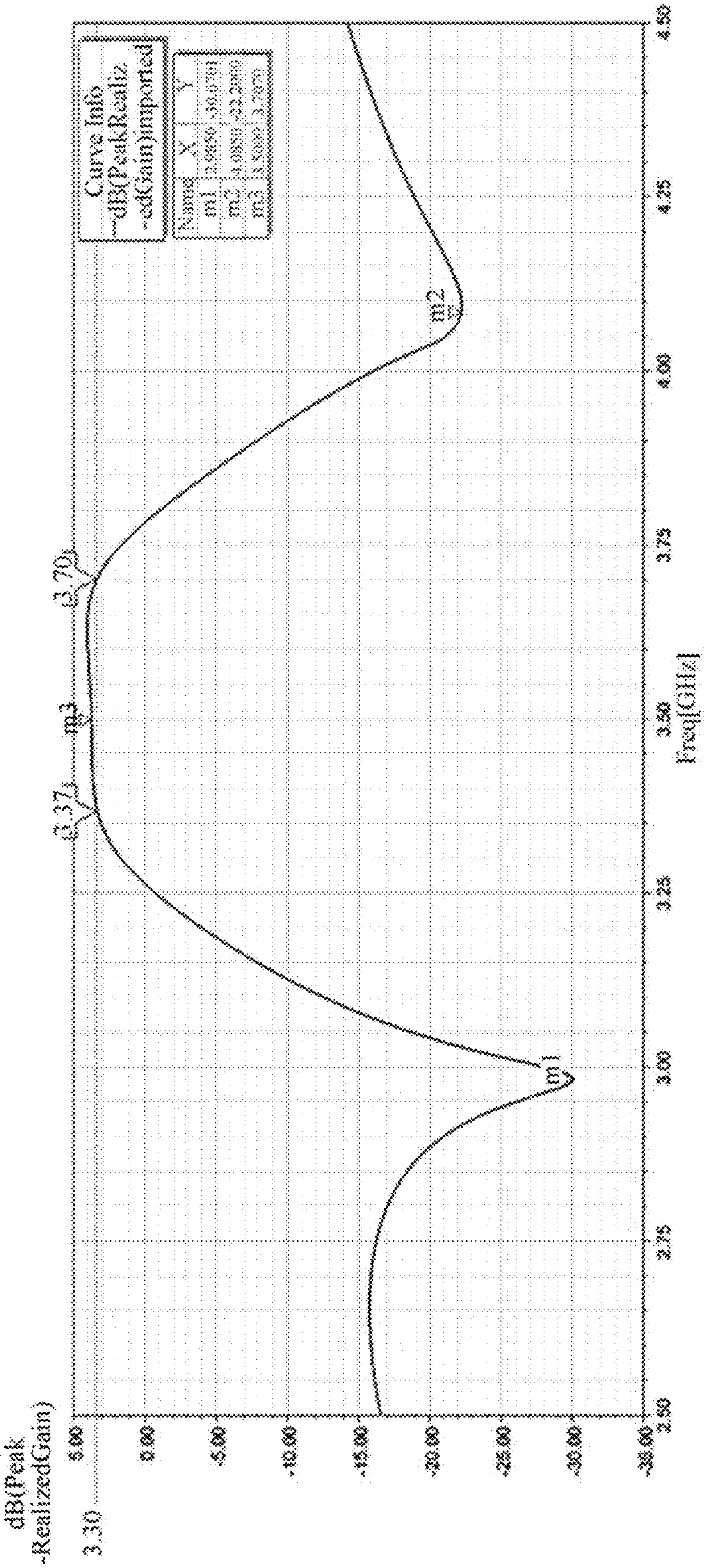
FIG. 3 is a frequency-gain simulation result diagram of a filtering antenna of a first verification example of the present disclosure.

FIG. 3 is a frequency-gain simulation result diagram of the filtering antenna in the first verification example, showing the simulated frequency (Freq)-actual gain (PeakRealizedGain) curve. Referring to FIG. 3, there is a radiation zero on each of the left and right sides of the pass-band, located at 2.985 GHz (low-frequency radiation zero) and 4.085 GHz (high-frequency radiation zero), respectively. The out-of-band suppression level is greater than −20 dB, and the gain flatness within the pass-band is good, and the gain in 3.37~3.70 GHz is greater than 3.3 dBi.

Figures 1, 4:
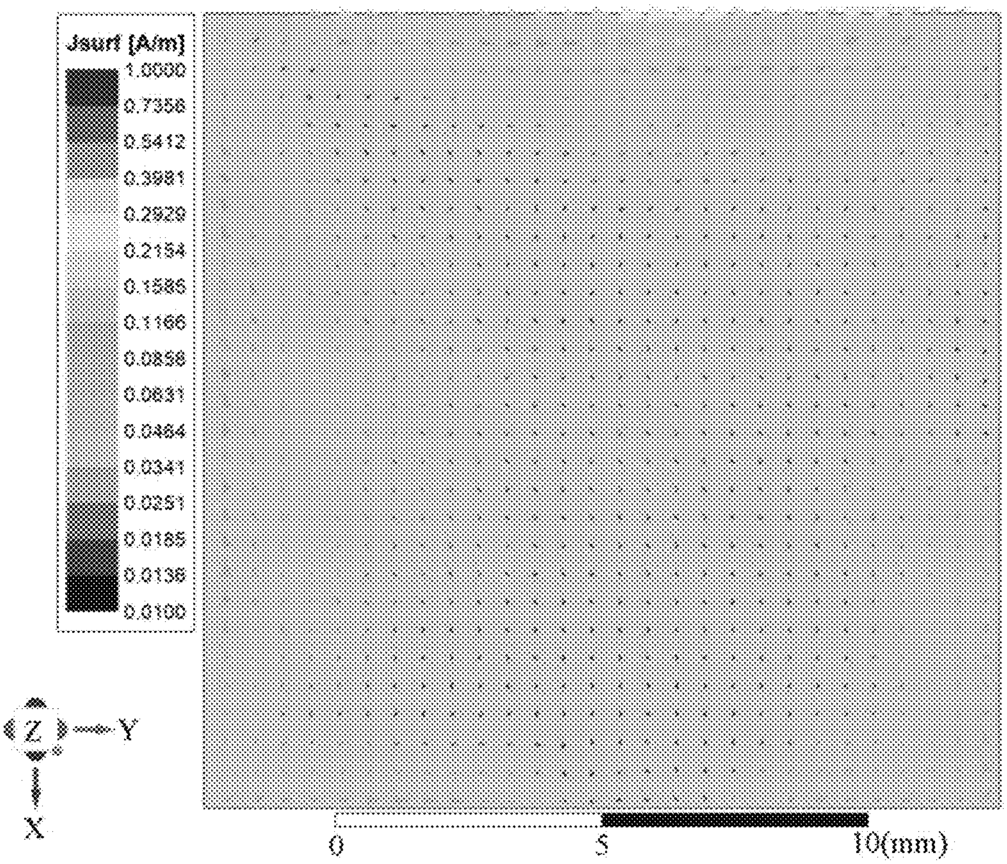
Figures 2, 4:
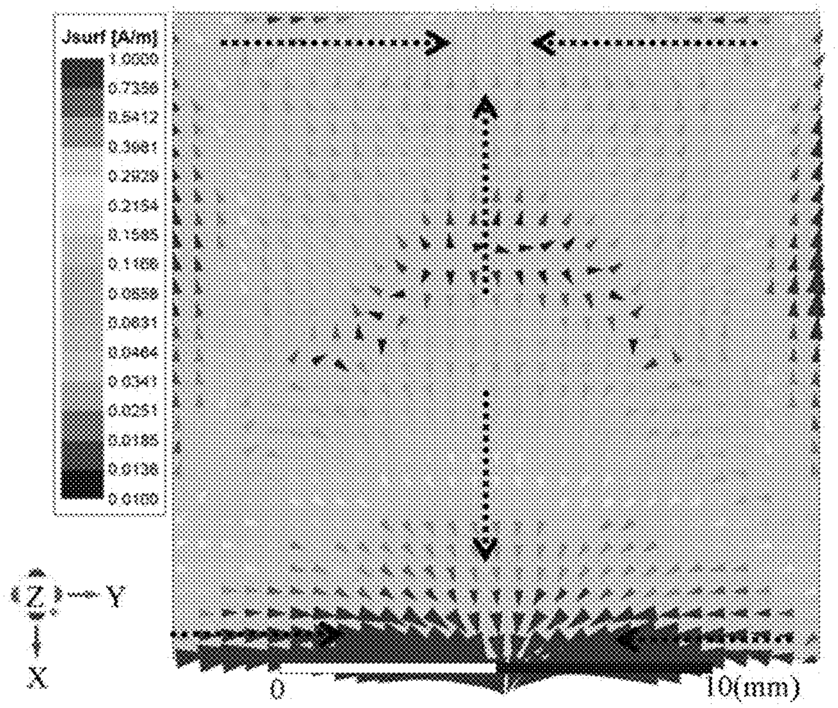

FIG. 4-1 shows a surface current (Jsurf) distribution diagram of the radiating patch at the low-frequency radiation zero. Referring to FIG. 4-1, at the low-frequency radiation zero, the current intensity on the radiating patch is very weak, and the radiating patch basically does not participate in radiation.

FIG. 4-2 shows a surface current (Jsurf) distribution diagram of the radiating patch at the high-frequency radiation zero. Referring to FIG. 4-2, at the high-frequency radiation zero, the current intensity in the middle of the radiating patch is weak and current intensity is distributed in opposite directions; two radiation edges extending along the second direction Y (particularly the radiation edge close to the second end of the trunk line PA) have a relatively large current intensity, and the current directions on both sides of a radiation edge are opposite and cancel each other. In this way, the filtering antenna creates a high-frequency radiation zero. In surface current distribution diagrams described later, dashed lines with arrows indicate the main directions of current flow.

Figures 1, 5:
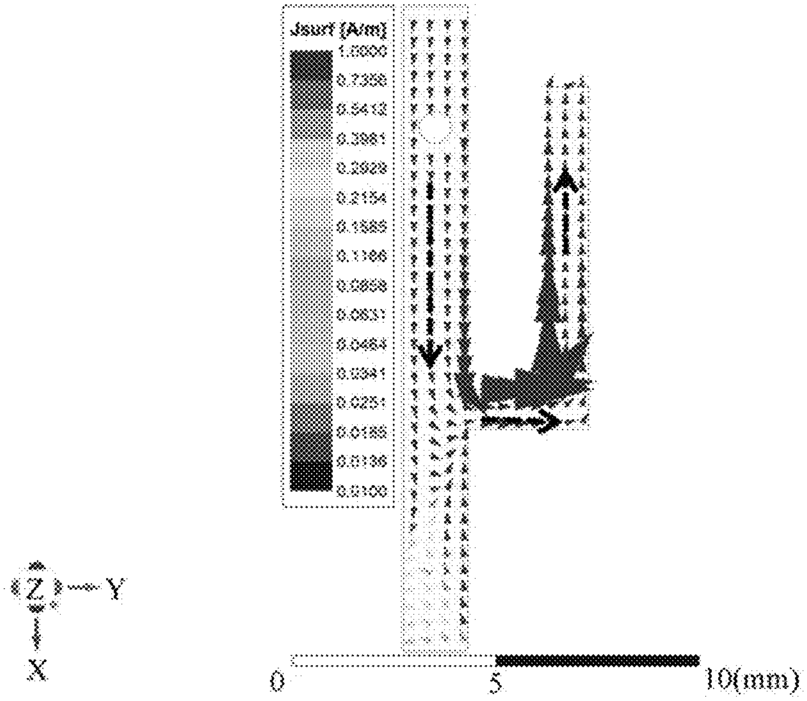
Figures 2, 5:
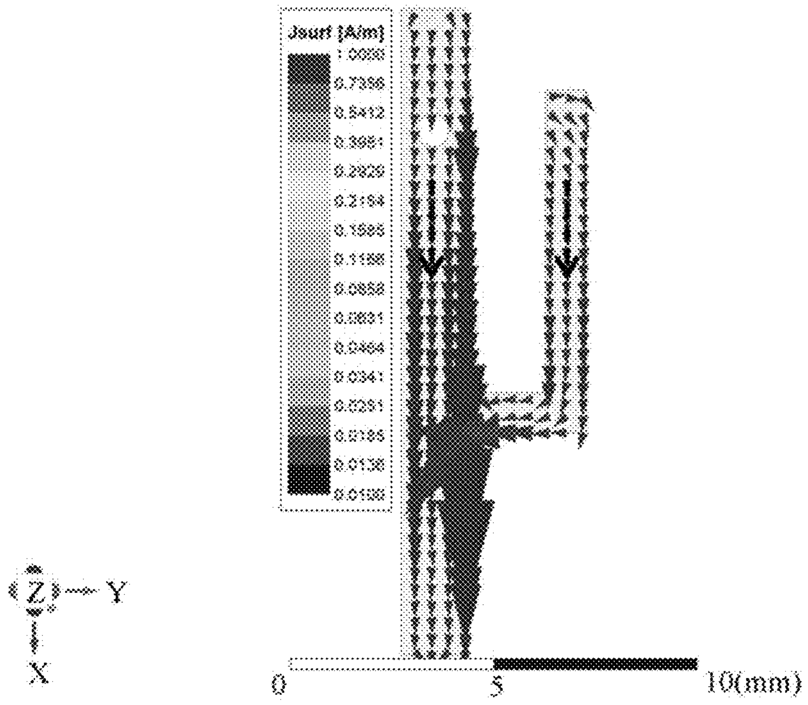

FIG. 5-1 shows a surface current (Jsurf) distribution diagram of the coupling probe PRB at a low-frequency radiation zero. Referring to FIG. 5-1, at the low-frequency radiation zero, the current on the second section PAB of the trunk line is very small, and the current directions on the first section PAA of the trunk line and the first branch line PB are opposite, and the energies cancel each other, and thus very little energy is coupled to the radiating patch, and the radiating patch basically does not participate in radiation. In this way, the filtering antenna produces a low-frequency radiation zero.

FIG. 5-2 shows a surface current (Jsurf) distribution diagram of the coupling probe PRB at a high-frequency radiation zero. Referring to FIG. 5-2, at the high-frequency radiation zero, the current directions on the first section PAA of the trunk line and the first branch line PB are the same, and the intensity is maximum on the second section PAB of the trunk line. This shows that the energy on the microstrip line PRB1 can be coupled to the radiating patch in large amounts. However, the induced current on the radiating patch is opposite, forming a high-frequency radiation zero.

Second Embodiment

FIG. 6 illustrates a schematic top view of a coupling probe PRB in a second embodiment of the present disclosure. Referring to FIGS. 6 and 2, the difference between the second embodiment and the first embodiment is that the open-circuit branch line further includes a third branch line PBx; the extension direction of the third branch line PBx is the same as the extension direction of the first branch line PB, and the third branch line PBx and the first branch line PB are respectively arranged at both sides of the second branch line PC. A first end of the third branch line PBx is connected to the second end of the second branch line PC. An orthographic projection of a second end of the third branch line PBx on the second dielectric layer ILDB is located within the orthographic projection of the radiating patch RP on the second dielectric layer ILDB.

Compared with the first embodiment, the second embodiment can increase the length of the open-circuit branch line. This reduces the low-frequency radiation zero.

In an implementation of the present disclosure, the length of the third branch line PBx is L2x; the distance between the orthographic projection of the second end of the third branch line PBx on the second dielectric layer ILDB and the orthographic projection of the edge RPE of the radiating patch on the second dielectric layer ILDB is X3. Optionally, $X3<L2x$, particularly $0.3 \le X3/L2x \le 0.4$.

The second embodiment further provides a second verification example. The only difference between the second verification example and the first verification example is that a third branch line PBx is added. The length L2x of the third branch line PBx is 2.5 millimeters; the width of the third branch line PBx is the same as the width of the first branch line PB, which is 1 millimeter.

The present disclosure simulates the second verification example through the HFSS software. Simulation results can be seen from FIG. 7, FIG. 8-1, FIG. 8-2, FIG. 9-1, and FIG. 9-2.

Figure 7:
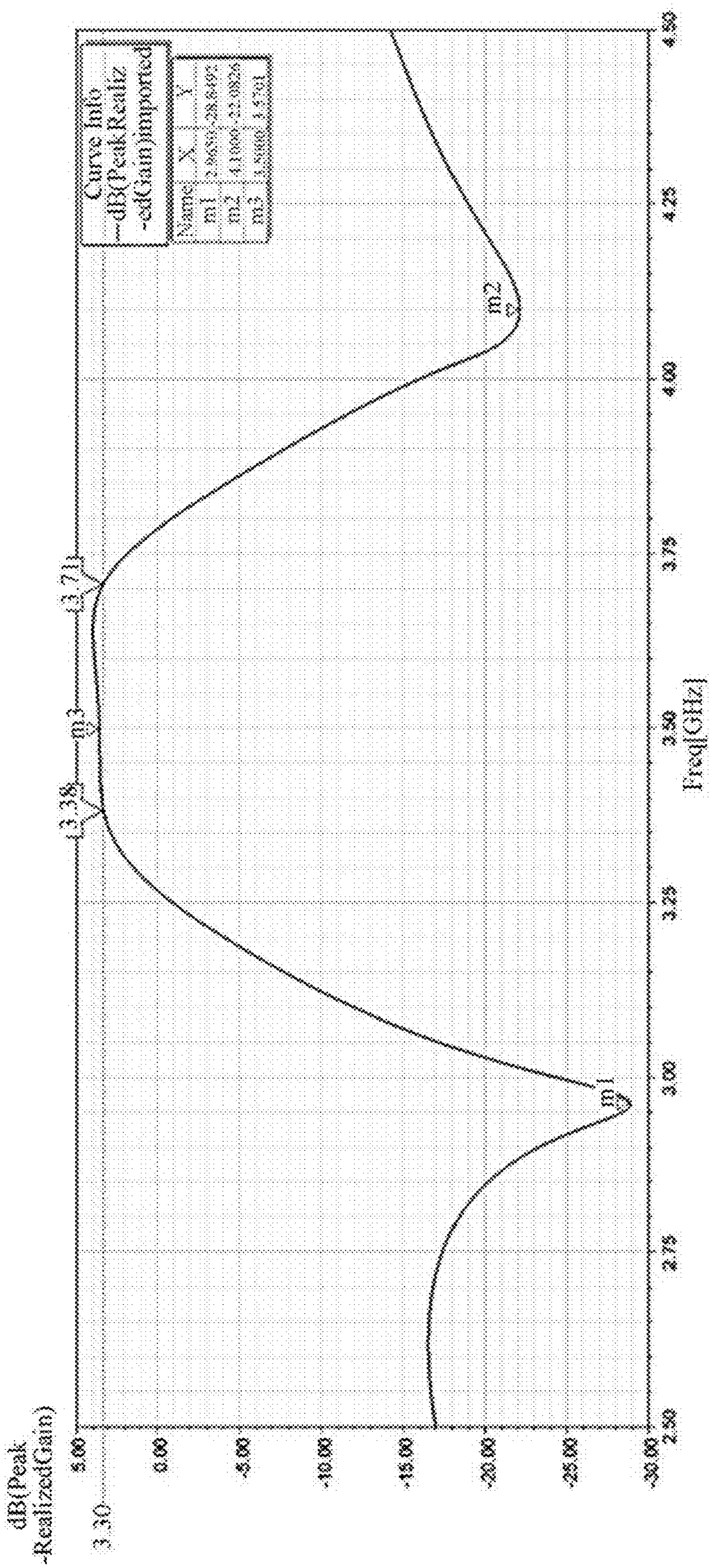
FIG. 7 is a frequency-gain simulation result diagram of a filtering antenna of a second verification example of the present disclosure.

FIG. 7 is a frequency-gain simulation result diagram of the filtering antenna in the second verification example, showing the simulated frequency (Freq)-actual gain (PeakRealizedGain) curve. Referring to FIG. 7, there is a radiation zero on each of the left and right sides of the pass-band, located at 2.965 GHz (low-frequency radiation zero) and 4.1 GHz (high-frequency radiation zero) respectively, the out-of-band suppression level is greater than −20 dB, and the gain flatness within the pass-band is good, and the gain in 3.38-3.71 GHz is greater than 3.3 dBi.

Figures 1, 8:
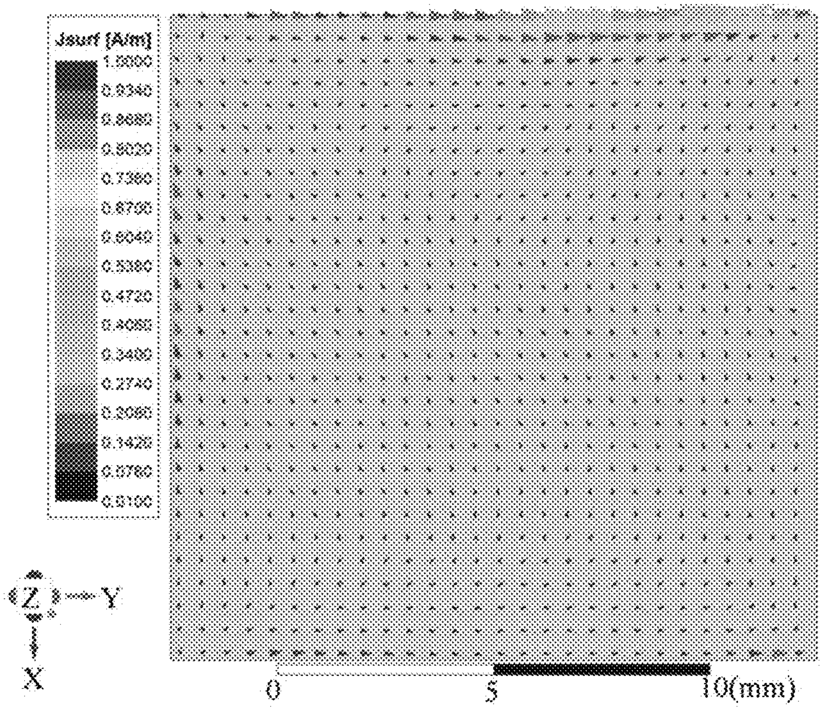
Figures 2, 8:
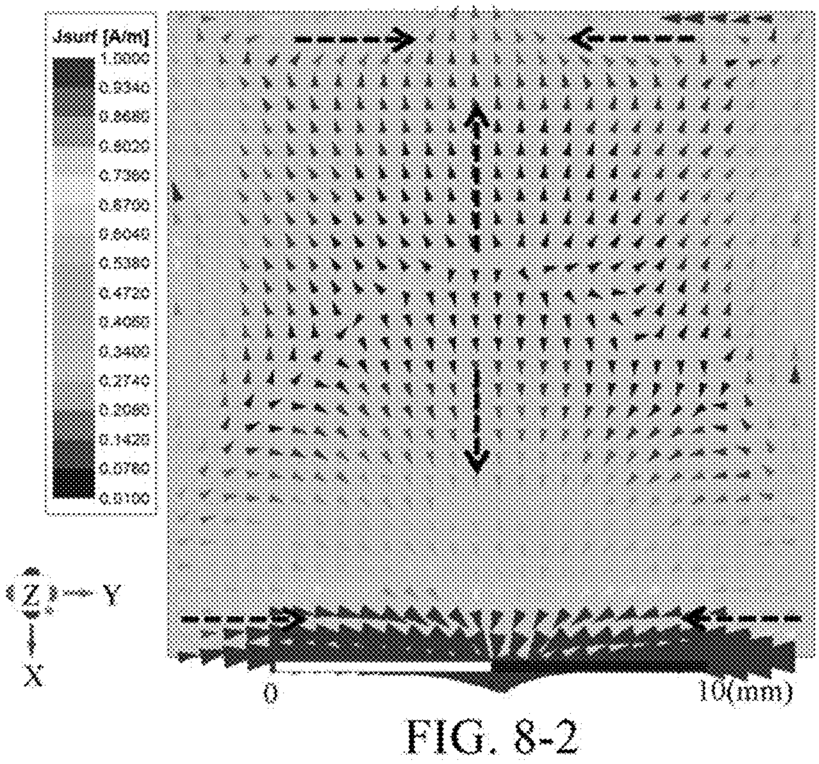

FIG. 8-1 shows a surface current (Jsurf) distribution diagram of the radiating patch at the low-frequency radiation zero. Referring to FIG. 8-1, at the low-frequency radiation zero, the current intensity on the radiating patch is very weak, and the radiating patch basically does not participate in radiation.

FIG. 8-2 shows a surface current (Jsurf) distribution diagram of the radiating patch at the high-frequency radiation zero. Referring to FIG. 8-2, at the high-frequency radiation zero, the current intensity in the middle of the radiating patch is weak and in opposite directions; two radiation edges extending along the second direction Y (particularly the radiation edge close to the second end of the trunk line PA) have a relatively large current intensity, and the current directions on both sides of a radiation edge are opposite and the current cancels each other. In this way, the filtering antenna creates a high-frequency radiation zero.

Figures 1, 9:
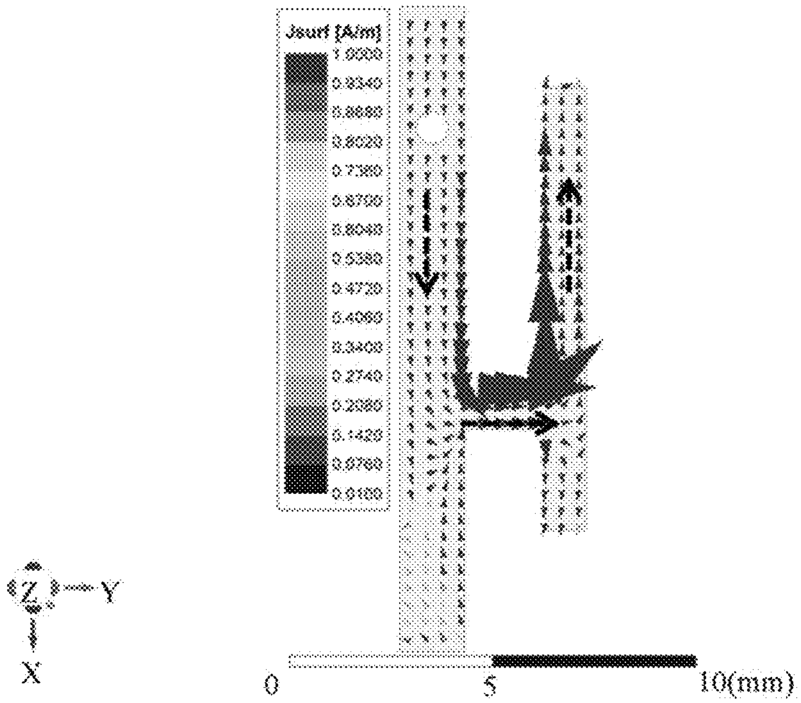
Figures 2, 9:
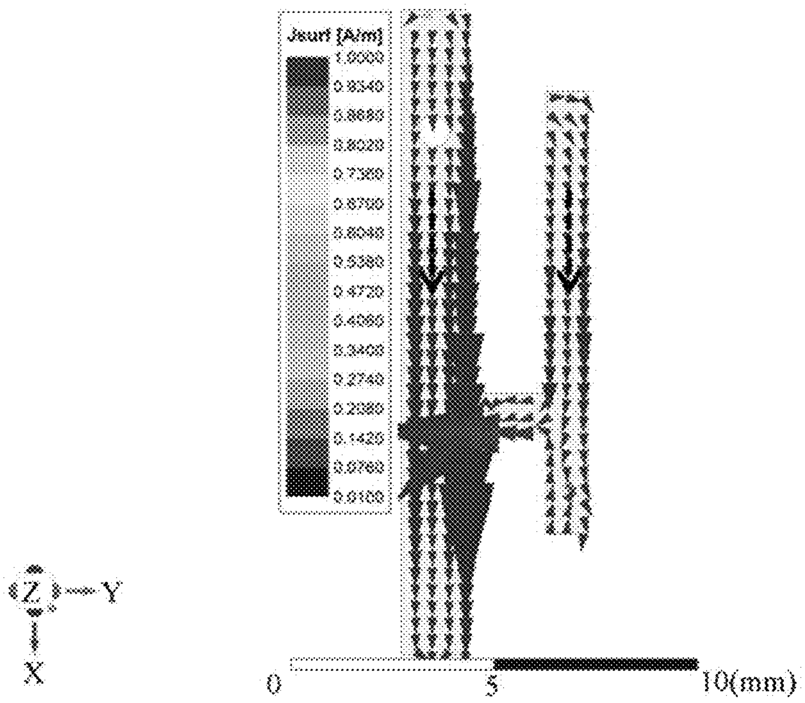

FIG. 9-1 shows a surface current (Jsurf) distribution diagram of the coupling probe PRB at the low-frequency radiation zero. Referring to FIG. 9-1, at the low-frequency radiation zero, the current on the second section PAB of the trunk line is very small, and the current directions on the first section PAA of the trunk line and the first branch line PB are opposite, and the energies cancel each other. Therefore, very little energy is coupled to the radiating patch, and the radiating patch basically does not participate in radiation. In this way, the filtering antenna produces a low-frequency radiation zero.

FIG. 9-2 shows a surface current (Jsurf) distribution diagram of the coupling probe PRB at the high-frequency radiation zero. Referring to FIG. 9-2, at the high-frequency radiation zero, the current directions on the first section PAA of the trunk line and the first branch line PB are the same, and the intensity is maximum on the second section PAB of the trunk line. This shows that the energy on the microstrip line PRB1 can be coupled to the radiating patch in large amounts. However, the induced current on the radiating patch is opposite, forming a high-frequency radiation zero.

Third Embodiment

FIG. 10 illustrates a schematic top view of a coupling probe PRB in a third embodiment of the present disclosure. Referring to FIG. 10 and FIG. 2, the difference between the third embodiment and the first embodiment is that the open-circuit branch line further includes a fifth branch line PE and a fourth branch line PD. The fourth branch line PD is arranged parallel to the trunk line PA, and the fourth branch line PD and the first branch line PB are located at both sides of the trunk line PA, respectively. The fifth branch line PE is perpendicular to the trunk line PA; a first end of the fifth branch line PE is connected to the trunk line PA, and a second end of the fifth branch line PE is connected to a first end of the four branch line PD; a second end of the fourth branch line PD is located at a side of the first end of the fourth branch line PD close to the feed center.

Compared with the first embodiment, the third embodiment can increase the length of the open-circuit branch line. The open-circuit branch line includes two parts located at both sides of the trunk line PA. One part includes the fifth branch line PE and the fourth branch line PD, and the other part includes the first branch line PB and the second branch line PC. On the one hand, by increasing the length of the open-circuit branch line, the radiation zero can be adjusted, particularly, the low-frequency radiation zero can be adjusted. On the other hand, the open-circuit branch line is distributed at both sides of the trunk line PA, which can have a greater impact on the current path on the microstrip line PRB1, which in turn has a significant impact on the sideband selectivity and the gain in the pass-band of the filtering antenna.

Optionally, the width W4 of the fourth branch line PD is the same as the width W2 of the first branch line PB, for example, both widths are 1 millimeter.

Optionally, referring to FIG. 10, the center line of the fifth branch line PE and the center line of the second branch line PC are located on the same straight line. Furthermore, the width W5 of the fifth branch line PE is the same as the width W3 of the second branch line PC, for example, both widths are 1 millimeter.

In the embodiment of the present disclosure, the distance between the fourth branch line PD and the trunk line PA is X4; the distance between the first branch line PB and the trunk line PA is X2. Optionally, X2 and X4 are basically equal. For example, X2 and X4 are the same, and for example, both of X2 and X4 are 2 millimeters.

Optionally, the length of the first branch line PB is L2, and the length of the fourth branch line PD is L4. Optionally, $L4<L2$, for example, $0.3 \leq L4/L2 \leq 0.4$. In this way, a balance between impedance matching and radiation zero matching can be achieved. For example, L2 is 7.5 millimeters and L4 is 2.5 millimeters.

The third embodiment also provides a third verification example. The only difference between this third verification example and the first verification example is that a fourth branch line PD and a fifth branch line PE are added. The length L4 of the fourth branch line PD is 2.5 millimeters, the length L5 of the fifth branch line PE is 3 millimeters, the width W4 of the fourth branch line PD is 1 millimeter, and the width W5 of the fifth branch line PE is 1 millimeter.

The present disclosure simulates the third verification example through the HFSS software. The simulation results can be seen from FIG. 11, FIG. 12-1, FIG. 12-2, FIG. 13-1, and FIG. 13-2.

Figure 11:
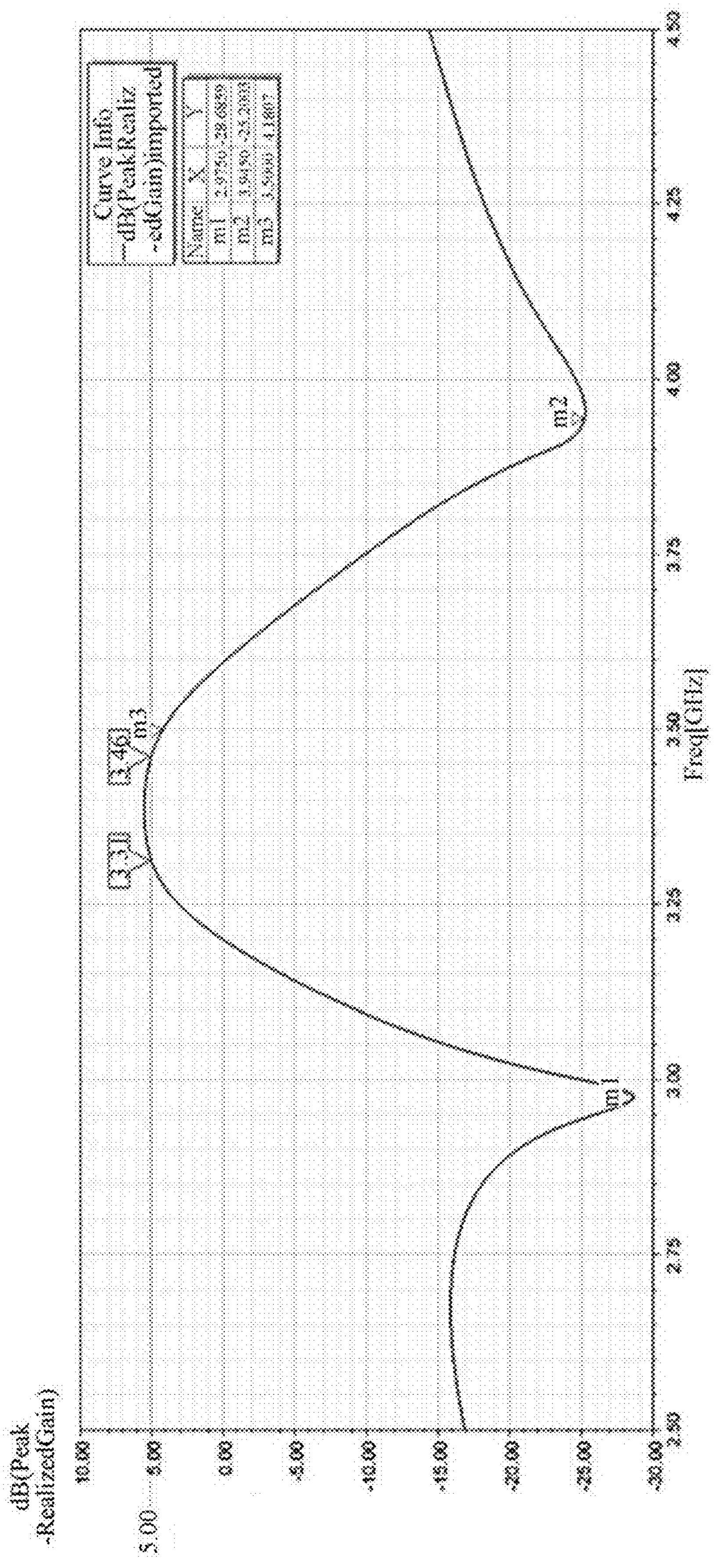
FIG. 11 is a frequency-gain simulation result diagram of a filtering antenna of a third verification example of the present disclosure.

FIG. 11 is a frequency-gain simulation result diagram of the filtering antenna in the third verification example, showing the simulated frequency (Freq)-actual gain (PeakRealizedGain) curve. Referring to FIG. 11, there is a radiation zero on each of the left and right sides of the pass-band, located at 2.975 GHz (low-frequency radiation zero) and 3.945 GHz (high-frequency radiation zero) respectively; the out-of-band suppression level is greater than −20 dB. Compared with the second verification example, the gain flatness in the pass-band of the third verification example is slightly deteriorated, and the sideband selectivity is slightly deteriorated, but the gain in the pass-band is significantly improved, and the gain in 3.31-3.46 GHz is greater than 5 dBi.

Figures 1, 12:
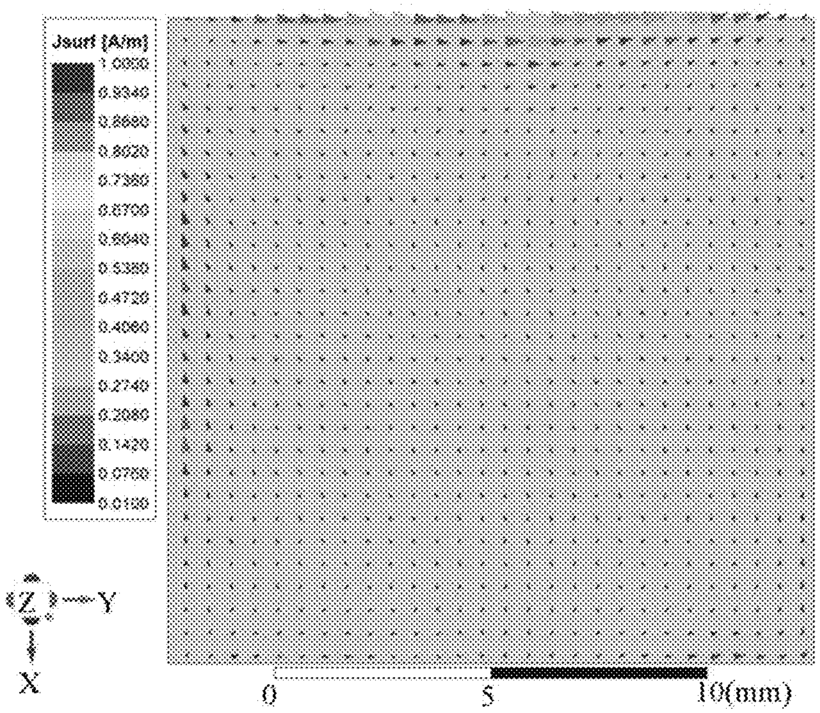
Figures 2, 12:
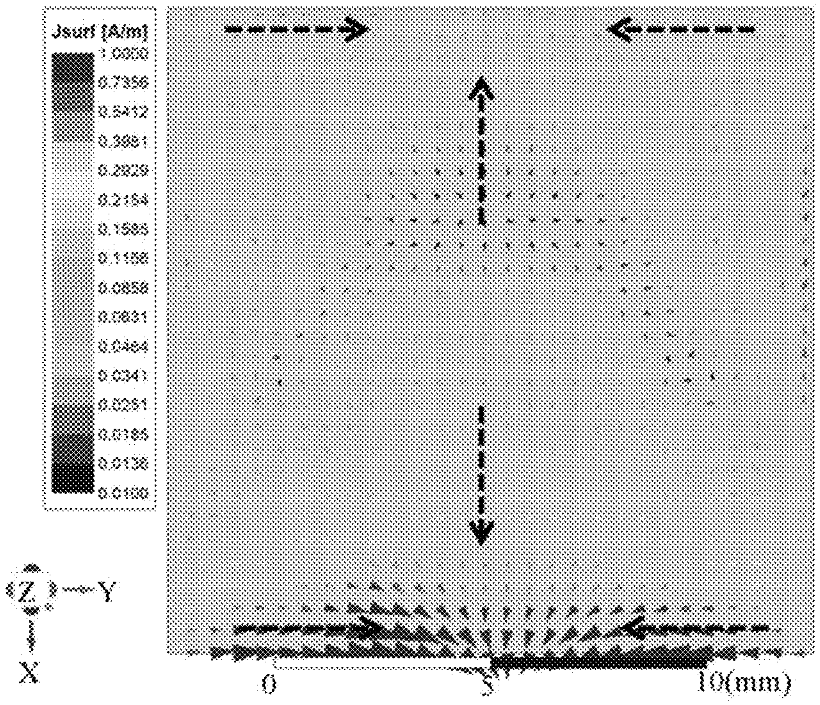

FIG. 12-1 shows a surface current (Jsurf) distribution diagram of the radiating patch at the low-frequency radiation zero. Referring to FIG. 12-1, at the low-frequency radiation zero, the current intensity on the radiating patch is very weak, and the radiating patch basically does not participate in radiation.

FIG. 12-2 shows a surface current (Jsurf) distribution diagram of the radiating patch at the high-frequency radiation zero. Referring to FIG. 12-2, at the high-frequency radiation zero, the current intensity in the middle of the radiating patch is weak and in opposite directions; two radiation edges extending along the second direction Y (particularly the radiation edge close to the second end of the trunk line PA) have a relatively large current intensity, and the current directions on both sides of a radiation edge are opposite and the current cancels each other. In this way, the filtering antenna creates a high-frequency radiation zero.

Figures 1, 13:
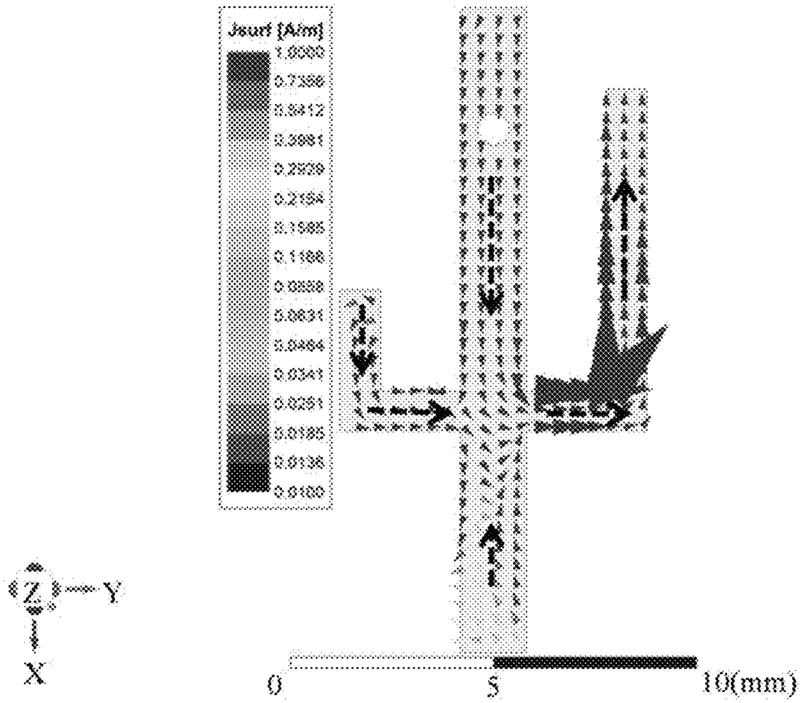
Figures 2, 13:
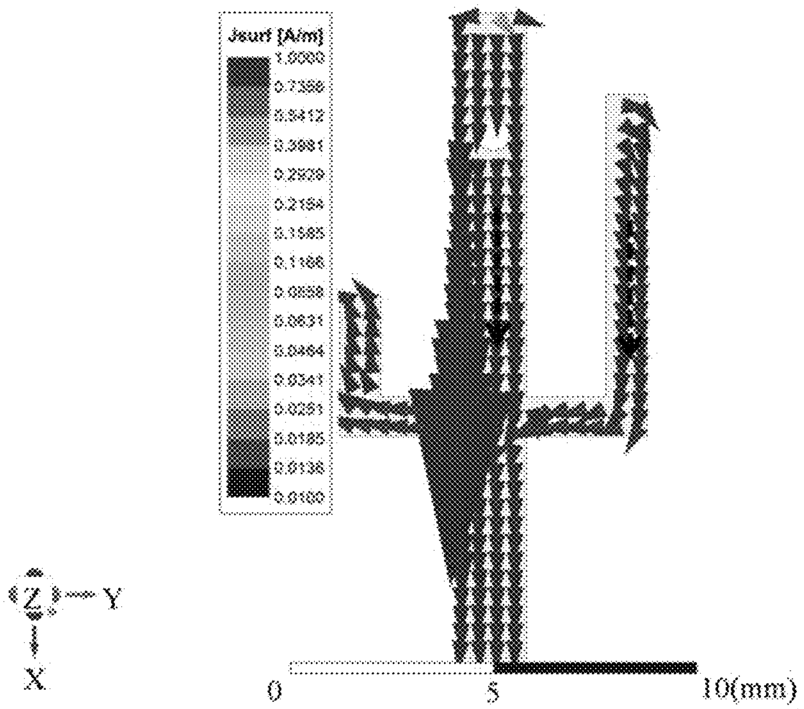

FIG. 13-1 shows a surface current (Jsurf) distribution diagram of the coupling probe PRB at the low-frequency radiation zero. Referring to FIG. 13-1, at the low-frequency radiation zero, the current directions on the first section PAA of the trunk line and the first branch line PB are opposite, and the energies cancel each other; the current directions on the second section PAB of the trunk line and the fourth branch line PD are opposite and the energies cancel each other. Therefore, very little energy is coupled to the radiating patch, and the radiating patch basically does not participate in radiation. In this way, the filtering antenna produces a low-frequency radiation zero.

FIG. 13-2 shows a surface current (Jsurf) distribution diagram of the coupling probe PRB at the high-frequency radiation zero. Referring to FIG. 13-2, at the high-frequency radiation zero, the current directions on the first section PAA of the trunk line and the first branch line PB are the same, and the intensity is maximum on the second section PAB of the trunk line. The current directions on the fourth branch line PD and the first section PAA of the trunk line are opposite, but the current intensity on the fourth branch line PD is smaller than the current intensity on the first section PAA of the trunk line. Therefore, a large amount of energy on the microstrip line PRB1 can be coupled to the radiating patch. However, the induced current on the radiating patch is opposite, forming a high-frequency radiation zero.

Fourth Embodiment

FIG. 14 illustrates a schematic top view of a coupling probe PRB in a fourth embodiment of the present disclosure. Referring to FIG. 14 and FIG. 2, the difference between the fourth embodiment and the first embodiment is that the open-circuit branch line further includes a fifth branch line PE and a fourth branch line PD. The fourth branch line PD is arranged parallel to the trunk line PA, and the fourth branch line PD and the first branch line PB are located at both sides of the trunk line PA, respectively. The fifth branch line PE is perpendicular to the trunk line PA. A first end of the fifth branch line PE is connected to the trunk line PA, and a second end of the fifth branch line PE is connected to a first end of the fourth branch line PD; the second end of the fourth branch line PD is located at a side of the first end of the fourth branch line PD away from the feed center. Compared with the third embodiment, the fourth branch line PD and the first branch line PB of the fourth embodiment are respectively located at both sides of the fifth branch line PE and the second branch line PC.

Compared with the first embodiment, the fourth embodiment can increase the length of the open-circuit branch line. The open-circuit branch line includes two parts located at both sides of the trunk line PA. One part includes the fifth branch line PE and the fourth branch line PD, and the other part includes the first branch line PB and the second branch line PC. On the one hand, by increasing the length of the open-circuit branch line, the radiation zero can be adjusted, particularly the low-frequency radiation zero can be adjusted. On the other hand, the open-circuit branch line is distributed at both sides of the trunk line PA, which can have a greater impact on the current path on the microstrip line PRB1, which in turn has a significant impact on the sideband selectivity and the gain in the pass-band of the filtering antenna.

Optionally, the width W4 of the fourth branch line PD is the same as the width W2 of the first branch line PB, for example, both widths are 1 millimeter.

Optionally, referring to FIG. 14, the center line of the fifth branch line PE and the center line of the second branch line PC are located on the same straight line. Furthermore, the width W5 of the fifth branch line PE is the same as the width W3 of the second branch line PC, for example, both widths are 1 millimeter.

In an implementation of the present disclosure, the distance between the fourth branch line PD and the trunk line PA is X4; the distance between the first branch line PB and the trunk line PA is X2. Optionally, X2 and X4 are basically equal, for example, $0.95 \leq X2/X4 \leq 1.05$. For example, X2 and X4 are the same, and for example, both X2 and X4 are 2 millimeters.

Optionally, the length of the first branch line PB is L2, and the length of the fourth branch line PD is L4, where $0.3 \leq L2/L4 < 0.4$. In this way, a balance between impedance matching and radiation zero matching can be achieved. For example, L2 is 7.5 millimeters and L4 is 2.5 millimeters.

Optionally, an orthographic projection of the second end of the fourth branch line PD on the second dielectric layer ILDB is located within the orthographic projection of the radiating patch RP on the second dielectric layer ILDB. The length of the fourth branch line PD is L4, and the distance between the orthographic projection of the second end of the fourth branch line PD on the second dielectric layer ILDB and the orthographic projection of the edge RPE of the radiating patch on the second dielectric layer ILDB is X5, where $X5 < L4$, for example, $0.3 \leq X5/L4 \leq 0.4$.

The fourth embodiment further provides a fourth verification example. The only difference between the fourth verification example and the third verification example is that the fourth branch line PD is located at a side of the fifth branch line PE away from the feed center. The present disclosure simulates the fourth verification example through the HFSS software. Simulation results can be seen from FIG. 15, FIG. 16-1, FIG. 16-2, FIG. 17-1, and FIG. 17-2.

Figure 15:
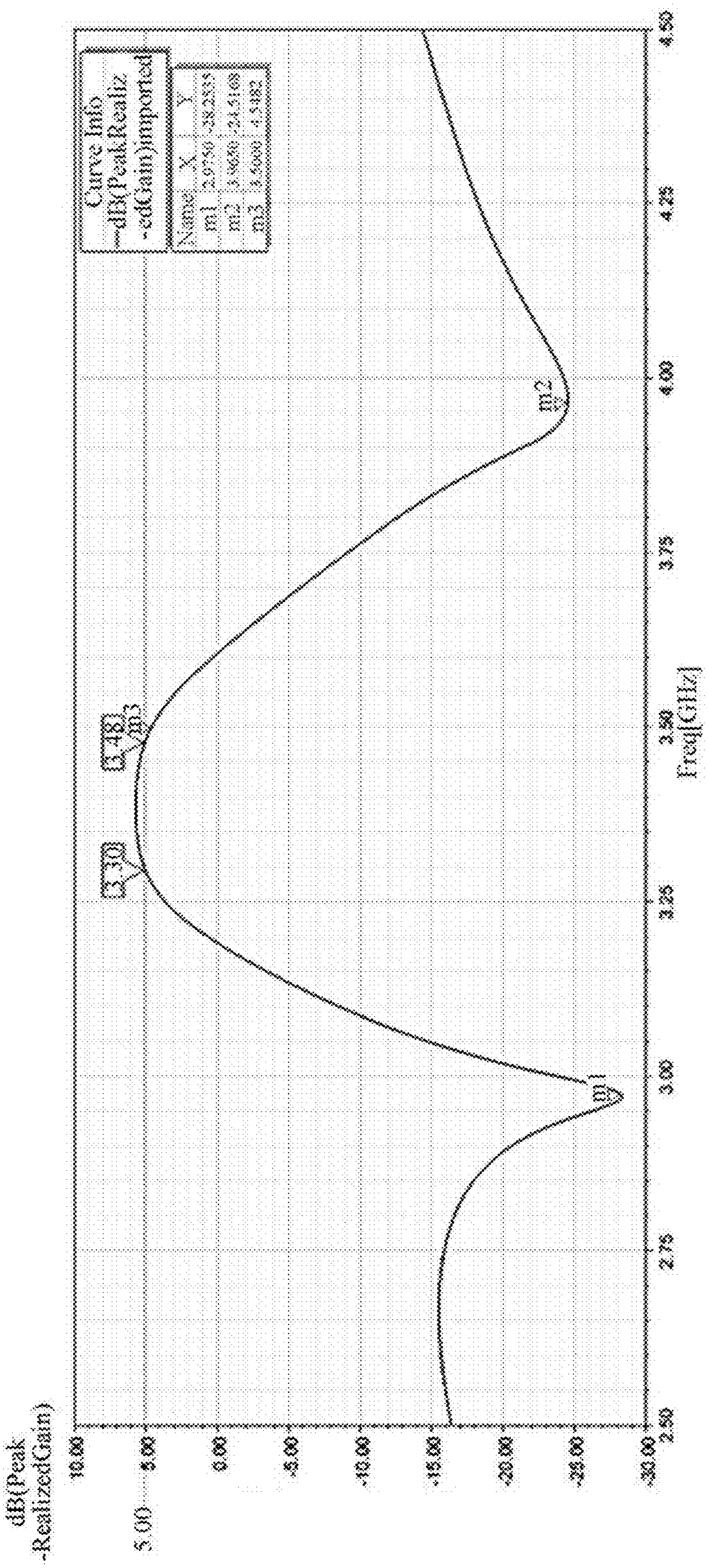
FIG. 15 is a frequency-gain simulation result diagram of a filtering antenna of a fourth verification example of the present disclosure.

FIG. 15 is a frequency-gain simulation result diagram of the filtering antenna in the fourth verification example, showing the simulated frequency (Freq)-actual gain (PeakRealizedGain) curve. Referring to FIG. 15, there is a radiation zero on each of the left and right sides of the pass-band, located at 2.975 GHz (low-frequency radiation zero) and 3.965 GHz (high-frequency radiation zero) respectively; the out-of-band suppression level is greater than-20 dB. Compared with the second verification example, the gain flatness in the pass-band of the fourth verification example is slightly deteriorated, and the sideband selectivity is slightly deteriorated, but the gain in the pass-band is significantly improved, and the gain in 3.30~3.48 GHz is greater than 5 dBi.

Figures 1, 16:
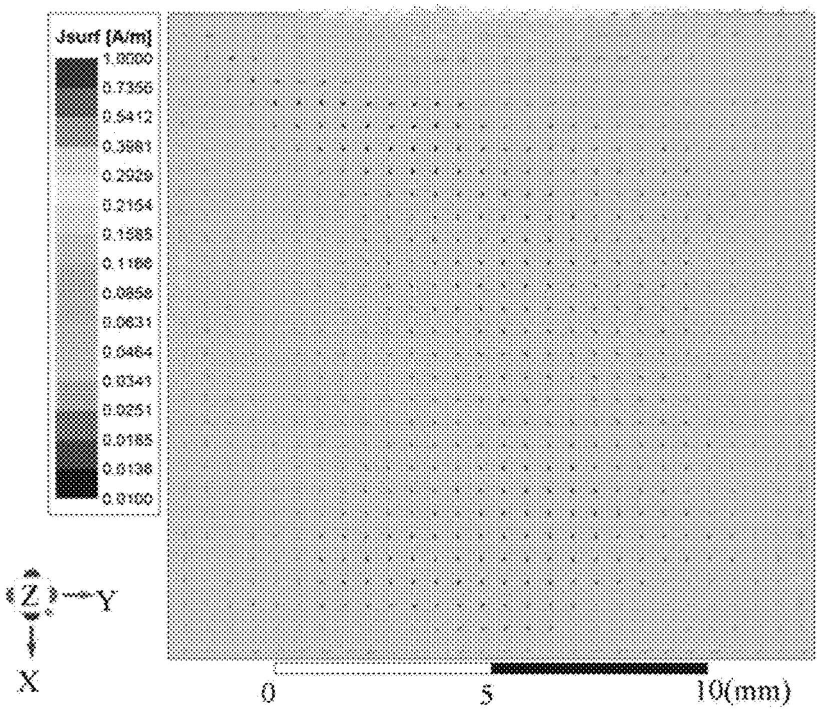
Figures 2, 16:
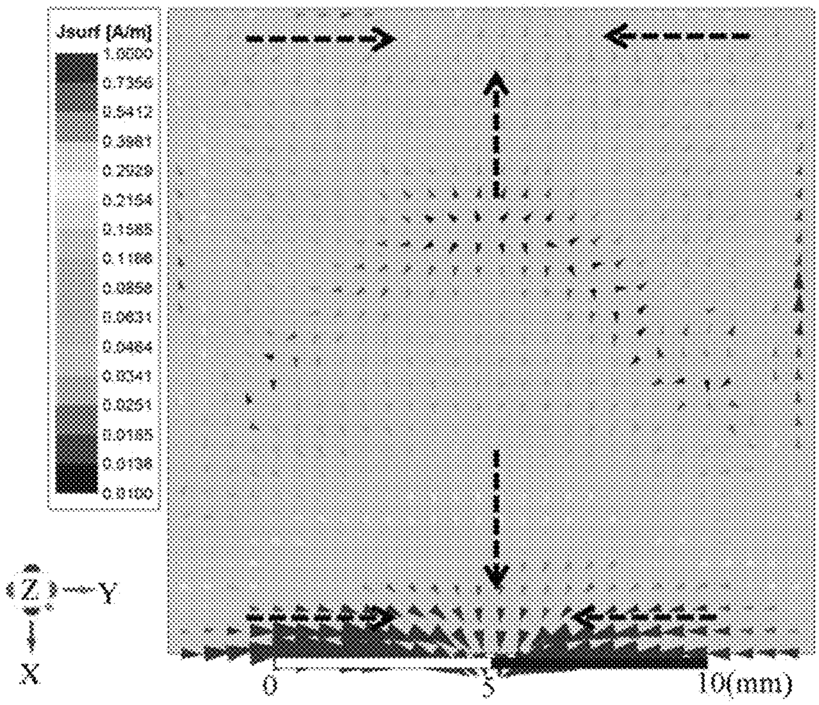

FIG. 16-1 shows a surface current (Jsurf) distribution diagram of the radiating patch at the low-frequency radiation zero. Referring to FIG. 16-1, at the low-frequency radiation zero, the current intensity on the radiating patch is very weak, and the radiating patch basically does not participate in radiation.

FIG. 16-2 shows a surface current (Jsurf) distribution diagram of the radiating patch at the high-frequency radiation zero. Referring to FIG. 16-2, at the high-frequency radiation zero, the current intensity in the middle of the radiating patch is weak and in opposite directions; two radiation edges extending along the second direction Y (particularly the radiation edge close to the second end of the trunk line PA) have a relatively large current intensity, and the current directions on both sides of a radiation edge are opposite and the current cancels each other. In this way, the filtering antenna creates a high-frequency radiation zero.

Figures 1, 17:
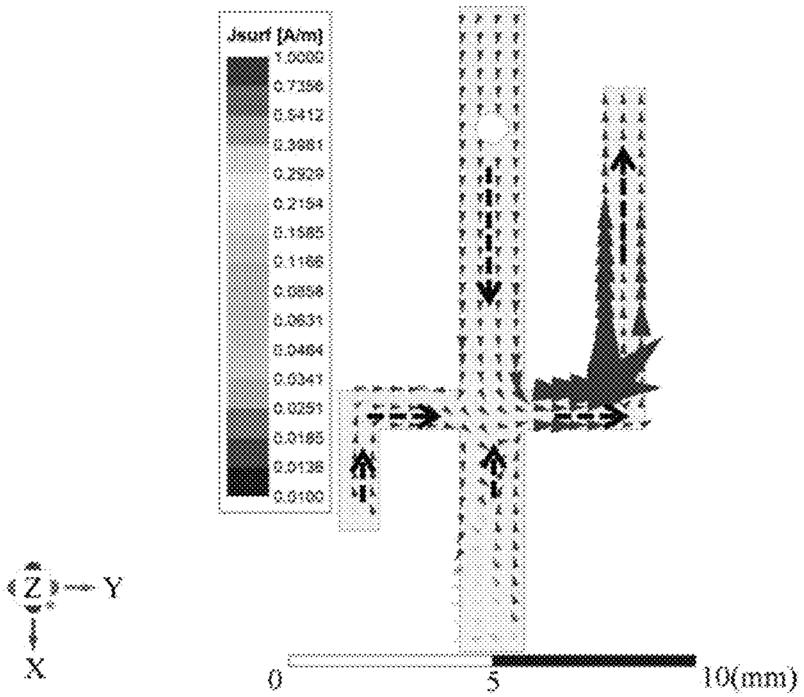
Figures 2, 17:
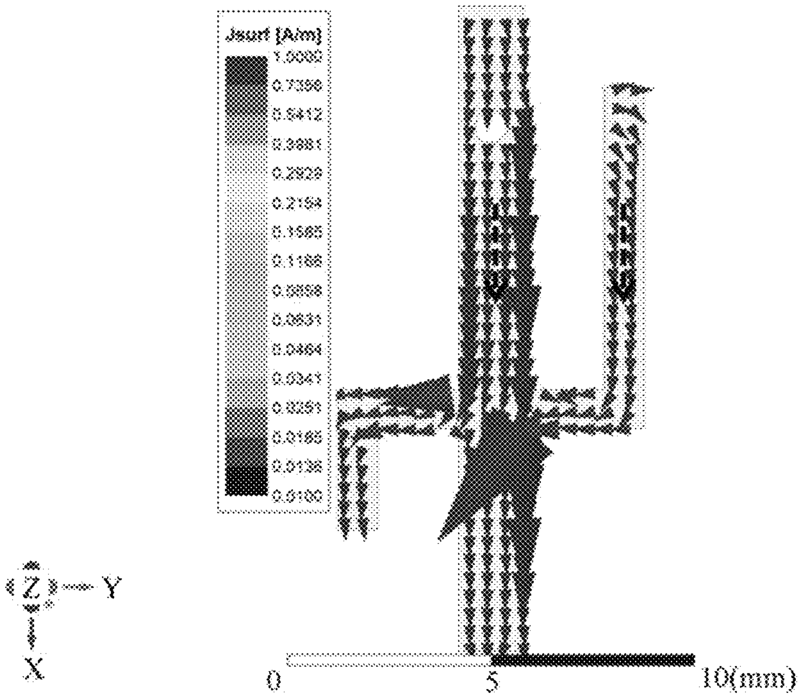

FIG. 17-1 shows a surface current (Jsurf) distribution diagram of the coupling probe PRB at the low-frequency radiation zero. Referring to FIG. 17-1, at the low-frequency radiation zero, the current directions on the first section PAA of the trunk line, the second section PAB of the trunk line, the first branch line PB and the fourth branch line PD are opposite, and the energies cancel each other. Therefore, very little energy is coupled to the radiating patch, and the radiating patch basically does not participate in radiation. In this way, the filtering antenna creates a low-frequency radiation zero.

FIG. 17-2 shows a surface current (Jsurf) distribution diagram of the coupling probe PRB at the high-frequency radiation zero. Referring to FIG. 17-2, at the high-frequency radiation zero, the current directions on the first section PAA of the trunk line, the second section PAB of the trunk line, the first branch line PB and the fourth branch line PD are the same, and the intensity is maximum on the second section PAB of the trunk line. Therefore, a large amount of energy on the microstrip line PRB1 can be coupled to the radiating patch. However, the induced current on the radiating patch is opposite, forming a high-frequency radiation zero.

Compared with the third verification example, the length of the open-circuit branch line in the fourth verification example remains unchanged, and the only difference is that the relative position of the fourth branch line PD with respect to the fifth branch line PE in the fourth verification example is opposite to that in the third verification. The change in the orientation of the fourth branch line PD has a small impact on the current path on the trunk line PA, and therefore has a small impact on the sideband selectivity and the gain within the band-pass of the filtering antenna.

Fifth Embodiment

FIG. 18 illustrates a schematic top view of a coupling probe PRB in a fifth embodiment of the present disclosure. Referring to FIG. 18 and FIG. 2, the difference between the fifth embodiment and the first embodiment is that the microstrip line PRB1 further includes a proximity coupling branch line. The proximity coupling branch line includes a sixth branch line PF. The sixth branch line PF is arranged in parallel with the trunk line PA, and the sixth branch line PF and the open-circuit branch line are located at both sides of the trunk line PA.

In an implementation of the present disclosure, the sixth branch line PF has a first end of the sixth branch line PF which is close to the first end of the trunk line PA and a second end of the sixth branch line PF which is close to the second end of the trunk line PA. In the first direction X, the size between the first end of the sixth branch line PF and the feed center is D6. Optionally, D6<D1, particularly 0.5≤D6/D1≤0.75, for example, D6/D1=0.66. In this implementation, in the first direction X, the first end of the sixth branch line PF is located between the feed center and the first end of the trunk line PA.

In an implementation of the present disclosure, the distance between the sixth branch line PF and the trunk line PA is D7. Optionally, D7 is no larger than the radius of the feeder PRB2. For example, the radius of feeder PRB2 is 0.4 millimeters, and D7 is 0.3 millimeters. In this way, there is a small gap between the trunk line PA and the sixth branch line PF, which is beneficial to the coupling between the trunk line PA and the sixth branch line PF.

In an implementation of the present disclosure, the length of the sixth branch line PF is L6. Optionally, L6<L1, particularly 0.9≤L6/L1<1.0. In this way, the second end of the trunk line PA and the second end of the sixth branch line PF can be close to each other. Of course, the length of the sixth branch line PF can be longer or shorter as needed. In one example, the second end of the sixth branch line PF is flush with the second end of the trunk line PA.

Optionally, the second end of the sixth branch line PF is beyond the coverage of the radiating patch RP.

In an implementation of the present disclosure, the width of the sixth branch line PF is W6. Optionally, 0.9≤W6/W1≤1.1, for example, W6=W1.

The fifth embodiment also provides a fifth verification example. The only difference between the fifth verification example and the first verification example is that a sixth branch line PF is added. The length L6 of the sixth branch line PF is 15 millimeters, and the width W6 of the sixth branch line PF is 1 millimeters; in the first direction X, the distance D6 between the first end of the sixth branch line PF and the feed center is 2 millimeters, and the second end of the sixth branch line PF is flush with the second end of the trunk line PA. The distance D7 between the sixth branch line PF and the trunk line PA is 0.3 millimeters.

The present disclosure simulates the fifth verification example through the HFSS software. Simulation results can be seen from FIG. 19, FIG. 20-1, FIG. 20-2, FIG. 21-1, and FIG. 21-2.

Figure 19:
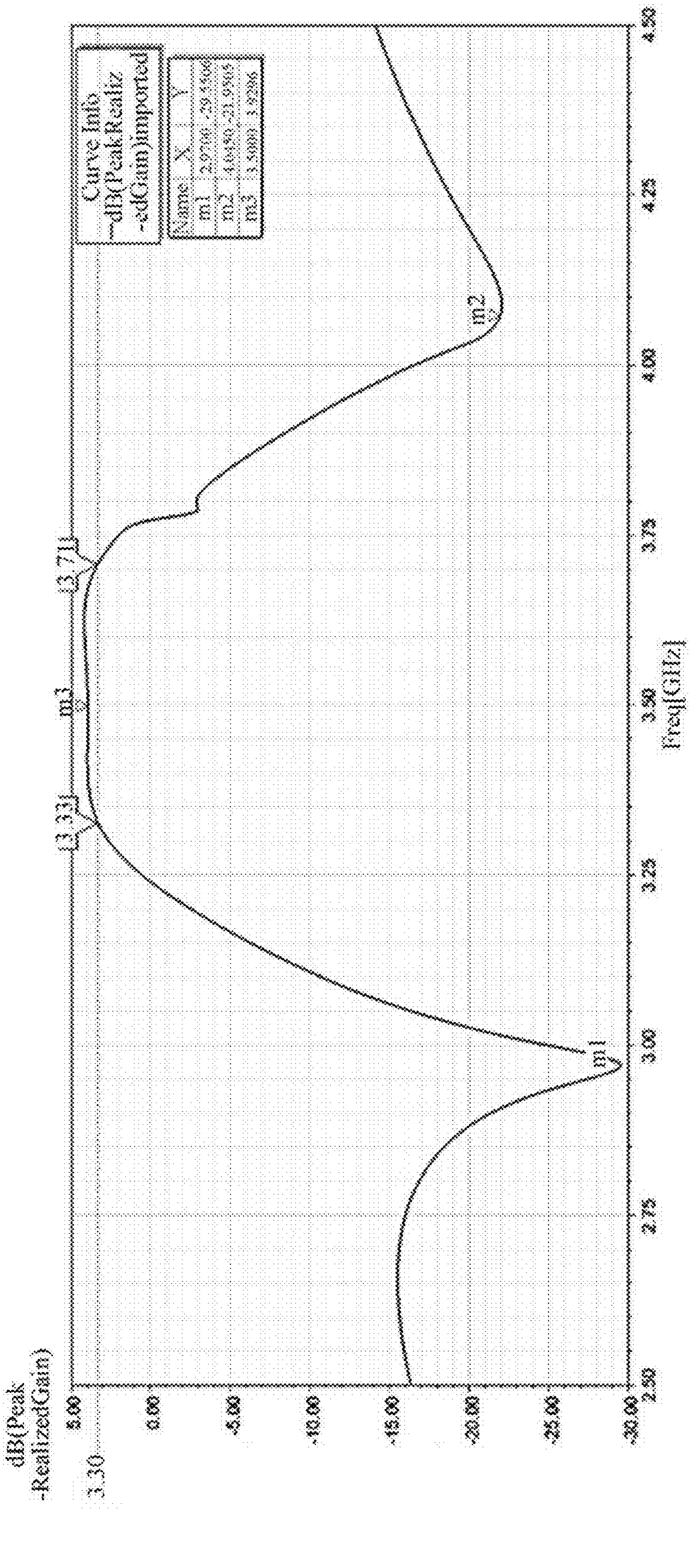
FIG. 19 is a frequency-gain simulation result diagram of a filtering antenna of a fifth verification example of the present disclosure.

FIG. 19 is a frequency-gain simulation result diagram of the filtering antenna in the fifth verification example, showing a simulated frequency (Freq)-actual gain (PeakRealizedGain) curve. Referring to FIG. 18, there is a radiation zero on each of the left and right sides of the pass-band, located at 2.97 GHz (low-frequency radiation zero) and 4.075 GHz (high-frequency radiation zero) respectively; the out-of-band suppression level is greater than-20 dB; the gain flatness within the pass-band is good, and the gain in 3.33-3.71 GHz is greater than 3.3 dBi.

Figures 1, 20:
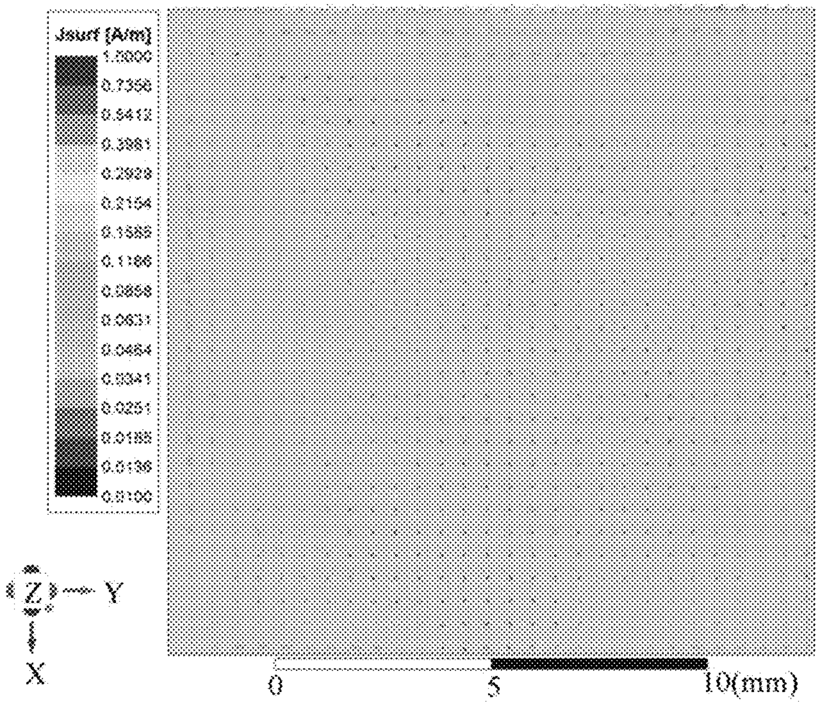
Figures 2, 20:
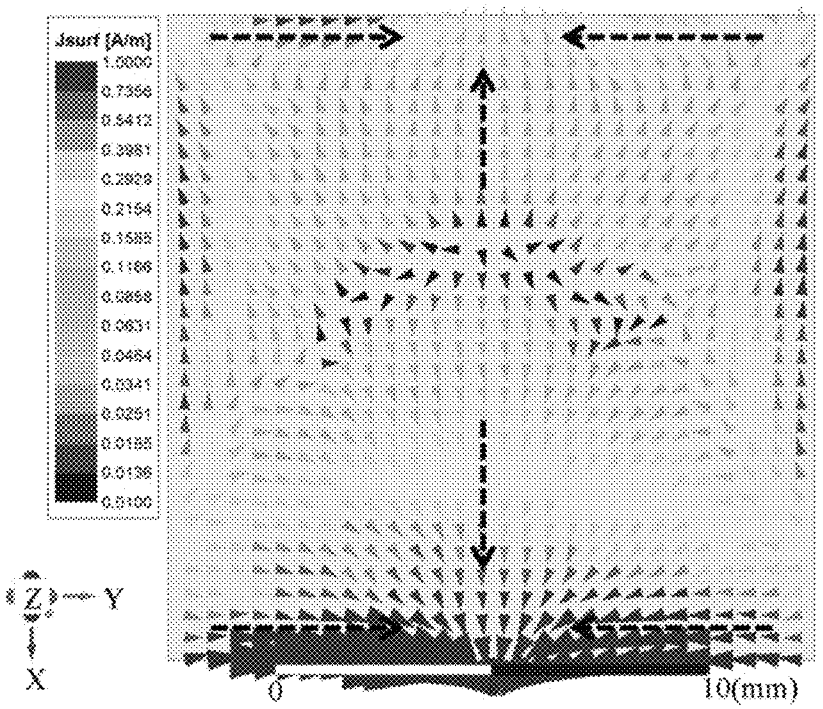

FIG. 20-1 shows a surface current (Jsurf) distribution diagram of the radiating patch at the low-frequency radiation zero. Referring to FIG. 20-1, at the low-frequency radiation zero, the current intensity on the radiating patch is very weak, and the radiating patch basically does not participate in radiation.

FIG. 20-2 shows a surface current (Jsurf) distribution diagram of the radiating patch at the high-frequency radiation zero. Referring to FIG. 20-2, at the high-frequency radiation zero, the current intensity in the middle of the radiating patch is weak and in opposite directions; two radiation edges extending along the second direction Y (particularly the radiation edge close to the second end of the trunk line PA) have a relatively large current intensity, and the current directions on both sides of a radiation edge are opposite and the current cancels each other. In this way, the filtering antenna creates a high-frequency radiation zero.

Figures 1, 21:
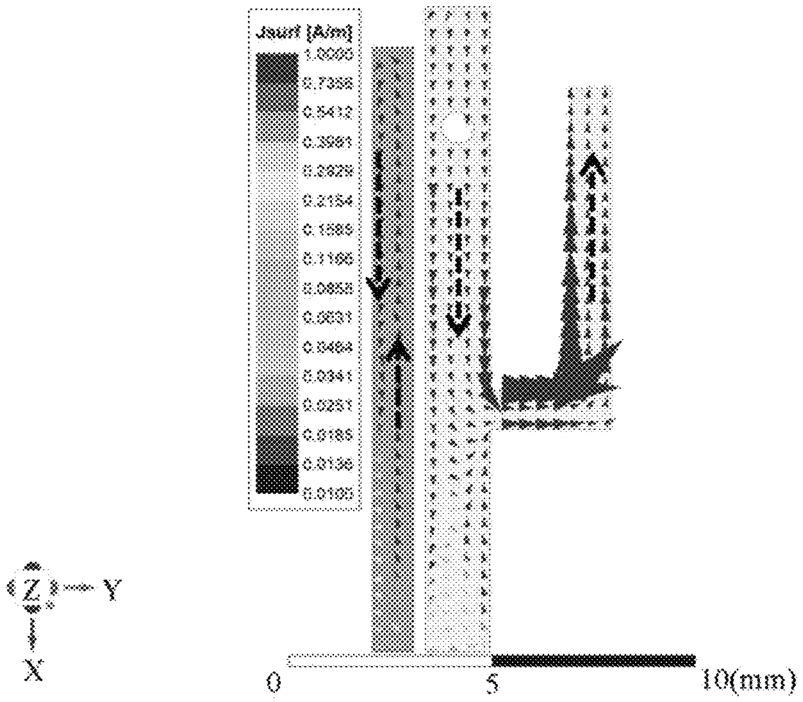
Figures 2, 21:
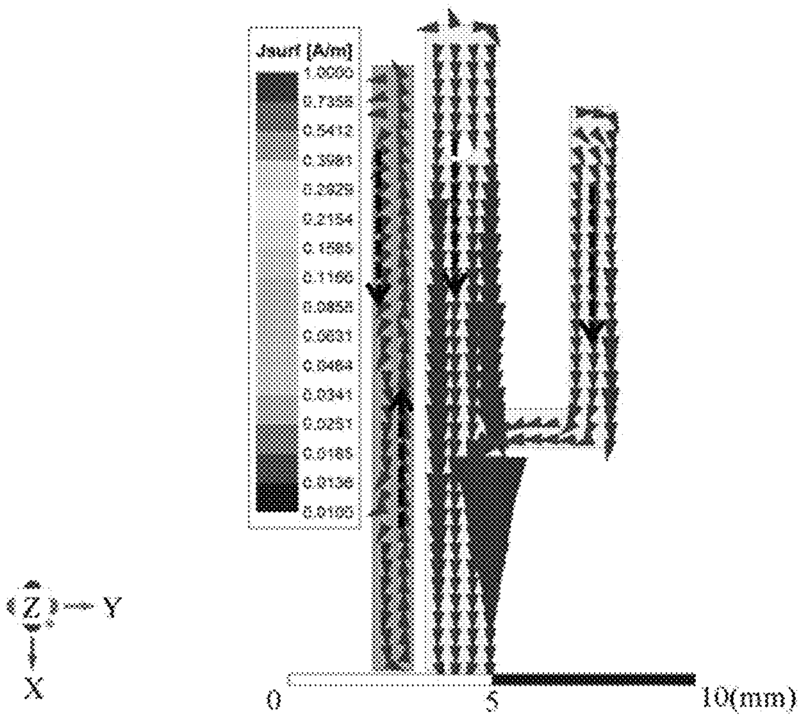

FIG. 21-1 shows a surface current (Jsurf) distribution diagram of the coupling probe PRB at the low-frequency radiation zero. Referring to FIG. 21-1, at the low-frequency radiation zero, the current directions on the first section PAA of the trunk line and the first branch line PB are opposite, and the energies cancel each other; the current directions on two coupling edges of the sixth branch line PF extending along the first direction X are opposite and the energies cancel each other. Therefore, very little energy is coupled to the radiating patch, and the radiating patch basically does not participate in radiation. In this way, the filtering antenna creates a low-frequency radiation zero.

FIG. 21-2 shows a surface current (Jsurf) distribution diagram of the coupling probe PRB at the high-frequency radiation zero. Referring to FIG. 21-2, at the high-frequency radiation zero, the current directions on the first section PAA of the trunk line and the first branch line PB are the same, and the intensity is maximum on the second section PAB of the trunk line. The current directions on the two coupling edges of the sixth branch line PF extending along the first direction X are opposite, and the energies cancel each other. Therefore, a large amount of energy on the microstrip line PRB1 can be coupled to the radiating patch. However, the induced current on the radiating patch is opposite, forming a high-frequency radiation zero.

Compared with the first verification example, the length of the open-circuit branch line in the fifth verification example remains unchanged, but a proximity coupling branch line is additionally introduced. However, the current direction on the proximity coupling branch line is opposite, and thus it has little impact on the current path on the trunk line PA, and has little impact on the sideband selectivity and pass-band gain of the filtering antenna.

Sixth Embodiment

FIG. 22 illustrates a schematic top view of a coupling probe PRB in a sixth embodiment of the present disclosure. Referring to FIG. 22 and FIG. 18, the difference between the sixth embodiment and the fifth embodiment is that the proximity coupling branch line further includes a seventh branch line PG. The seventh branch line PG is perpendicular to the sixth branch line PF. A first end of the seventh branch line PG is connected to the sixth branch line PF, and an orthographic projection of a second end of the seventh branch line PG on the second dielectric layer ILDB is located outside the orthographic projection of the radiating patch RP on the second dielectric layer ILDB. In other words, the seventh branch line PG extends along the second direction Y and is arranged at a side of the sixth branch line PF away from the trunk line PA. The second end of the seventh branch line PG extends out of the coverage range of the radiating patch RP.

In an implementation of the present disclosure, the seventh branch line PG has a first edge of the seventh branch line PG and a second edge of the seventh branch line PG that are oppositely arranged. In the first direction, the first edge of the seventh branch line PG is located at a side of the second edge of the seventh branch line PG close to the feed center. The distance between the feed center and a straight line where the first edge of the seventh branch line PG is located is D8; the length of the sixth branch line PF is L6x.

Optionally, 0.3≤D8/L6x≤0.4.

In an implementation of the present disclosure, the sixth branch line PF has a first end of the sixth branch line PF which is close to the first end of the trunk line PA and a second end of the sixth branch line PF which is close to the first end of the trunk line PA. The distance between the first end of the sixth branch line PF and the first edge of the seventh branch line PG is X6, and the distance between the second end of the sixth branch line PF and the second edge of the seventh branch line PG is X7.

Optionally, X6 and X7 are basically equal, for example, 0.95≤X6/X7≤1.05.

In an implementation of the present disclosure, referring to FIG. 22, the second end of the sixth branch line PF and the second end of the trunk line PA both extend out of the coverage range of the radiating patch RP. The distance between the orthographic projection of the second end of the sixth branch line PF on the second dielectric layer ILDB and the orthographic projection of the edge RPE (the loser edge) of the radiating patch on the second dielectric layer ILDB is D9. The distance between the orthographic projection of the second end of the trunk line PA on the second dielectric layer ILDB and the orthographic projection of the edge RPE of the radiating patch on the second dielectric layer ILDB is D5. Optionally, D9>D5, for example, 1.9≤D9/D5≤2.0.

In an implementation of the present disclosure, the distance between the orthographic projection of the second end of the seventh branch line PG on the second dielectric layer ILDB and the orthographic projection of the edge RPE (the left edge) of the radiating patch on the second dielectric layer ILDB is D10, and the length of the seventh branch line PG is L7. Optionally, 0.3≤D10/L7≤0.4.

Optionally, the width W7 of the seventh branch line PG is greater than the width W6 of the sixth branch line PF.

In this embodiment, the introduced proximity coupling branch line includes both the sixth branch line PF extending along the first direction X and the seventh branch line PG extending along the second direction Y, and the ends of the sixth branch line PF and the seven branch lines PG all extend out of the coverage range of the radiating patch RP. Therefore, the proximity coupling branch line can have a greater impact on the current path on the trunk line PA, thereby adjusting the performance of the filtering antenna.

The sixth embodiment also provides a sixth verification example. The sixth verification example differs from the first verification example only in that a sixth branch line PF and a seventh branch line PG are added. The length L6x of the sixth branch line PF is 17 millimeters, and the width W6 of the sixth branch line PF is 1 millimeter; in the first direction X, the distance D6 between the first end of the sixth branch line PF and the feed center is 2 millimeters. The distance D7 between the sixth branch line PF and the trunk line PA is 0.3 millimeters. The length L7 of the seventh branch line PG is 8 millimeters, and the width W7 of the seventh branch line PG is 1.2 millimeters. In the first direction X, the distance D8 between the first edge of the seventh branch line PG and the feed center is 5.9 millimeters.

The present disclosure simulates the sixth verification example through the HFSS software. Simulation results can be seen from FIG. 23, FIG. 24-1, FIG. 24-2, FIG. 25-1, and FIG. 25-2.

Figure 23:
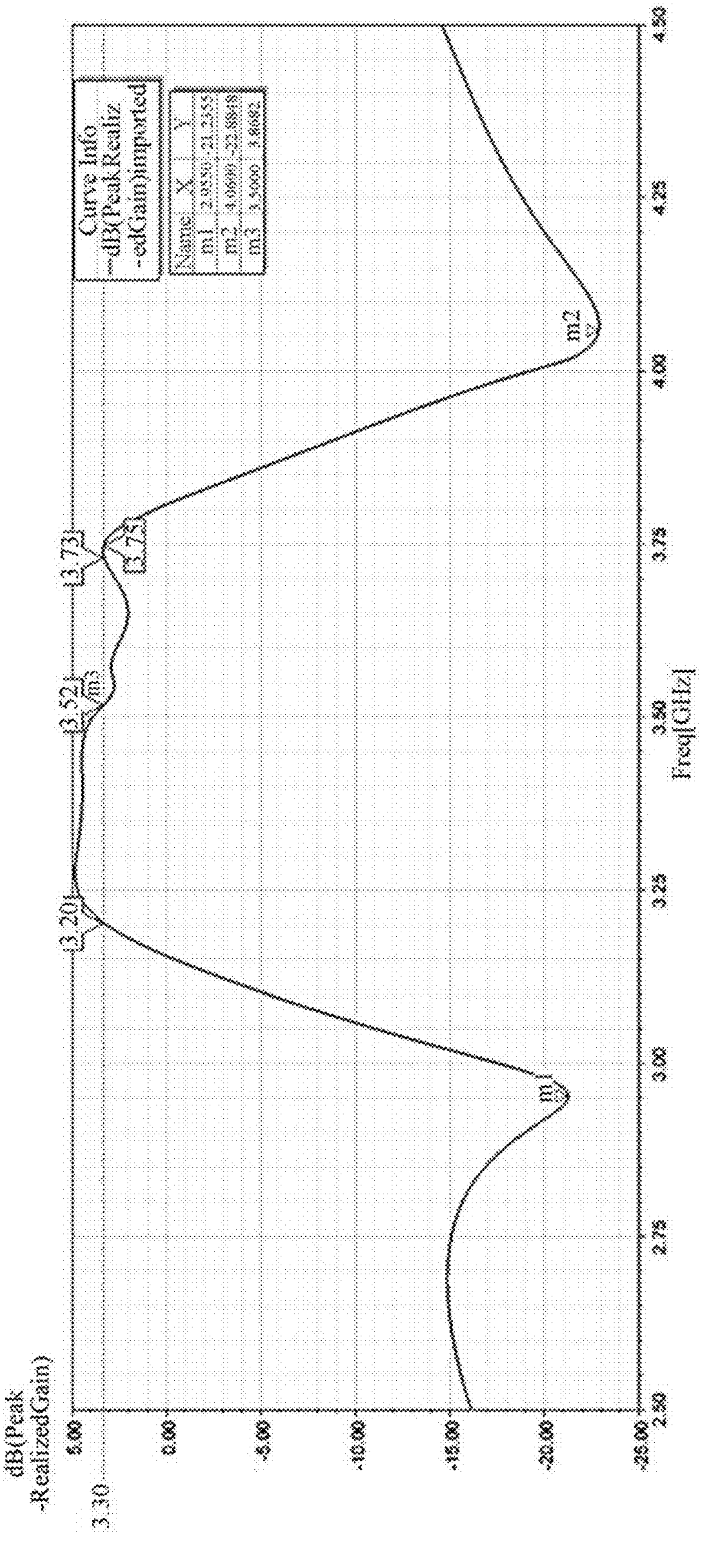
FIG. 23 is a frequency-gain simulation result diagram of a filtering antenna of a sixth verification example of the present disclosure.

FIG. 23 is a frequency-gain simulation result diagram of the filtering antenna in the sixth verification example, showing a simulated frequency (Freq)-actual gain (PeakRealizedGain) curve. Referring to FIG. 23, there is a radiation zero on each of the left and right sides of the pass-band, located at 2.955 GHz (low-frequency radiation zero) and 4.06 GHz (high-frequency radiation zero), respectively; the out-of-band suppression level is greater than-20 dB. Compared with the first verification example, the gain flatness in the pass-band and the sideband selectivity of the sixth verification example are slightly deteriorated, and the gain in 3.20-3.52 GHz is greater than 3.3 dBi.

Figures 1, 24:
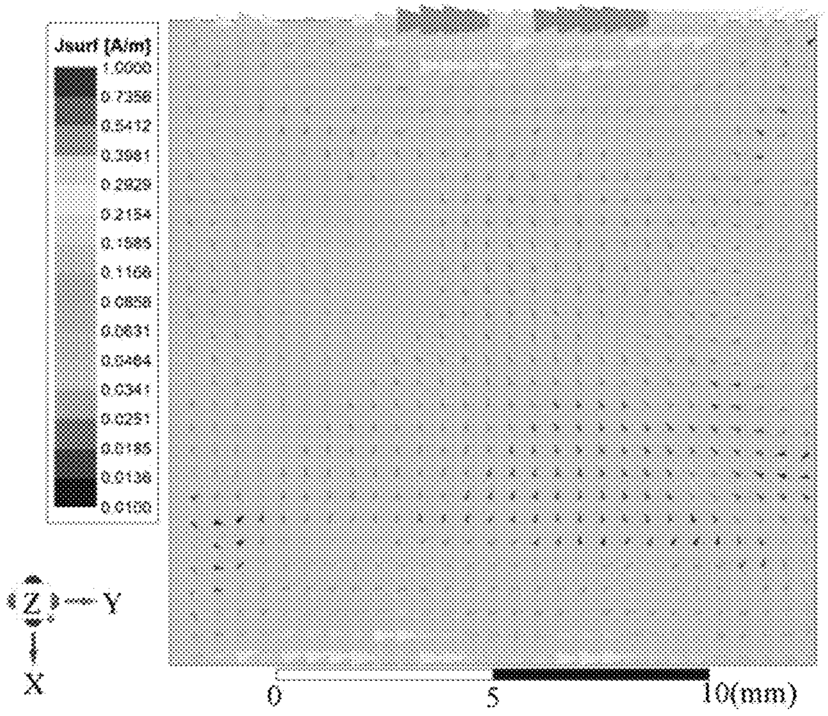
Figures 2, 24:
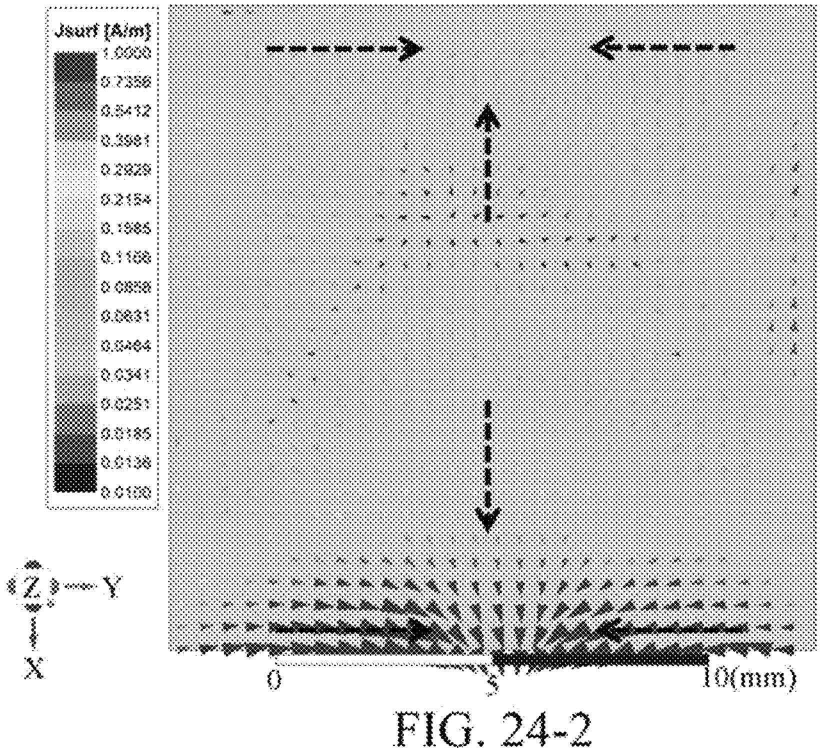

FIG. 24-1 shows a surface current (Jsurf) distribution diagram of the radiating patch at the low-frequency radiation zero. Referring to FIG. 24-1, at the low-frequency radiation zero, the current intensity on the radiating patch is very weak, and the radiating patch basically does not participate in radiation.

FIG. 24-2 shows a surface current (Jsurf) distribution diagram of the radiating patch at the high-frequency radiation zero. Referring to FIG. 24-2, at the high-frequency radiation zero, the current intensity in the middle of the radiating patch is weak and in opposite directions; two radiation edges extending along the second direction Y (particularly the radiation edge close to the second end of the trunk line PA) have a relatively large current intensity, and the current directions on both sides of a radiation edge are opposite and the current cancels each other. In this way, the filtering antenna creates a high-frequency radiation zero.

Figures 1, 25:
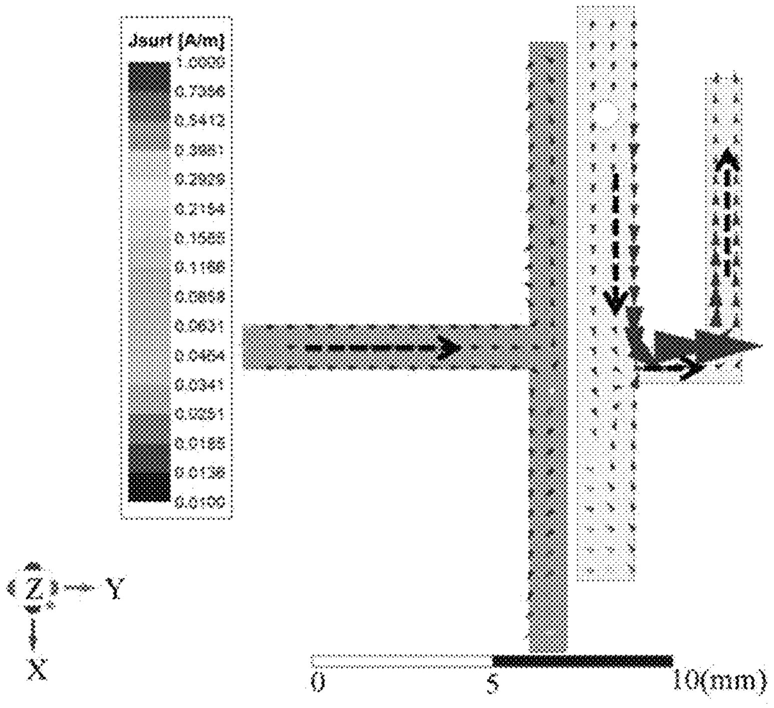
Figures 2, 25:
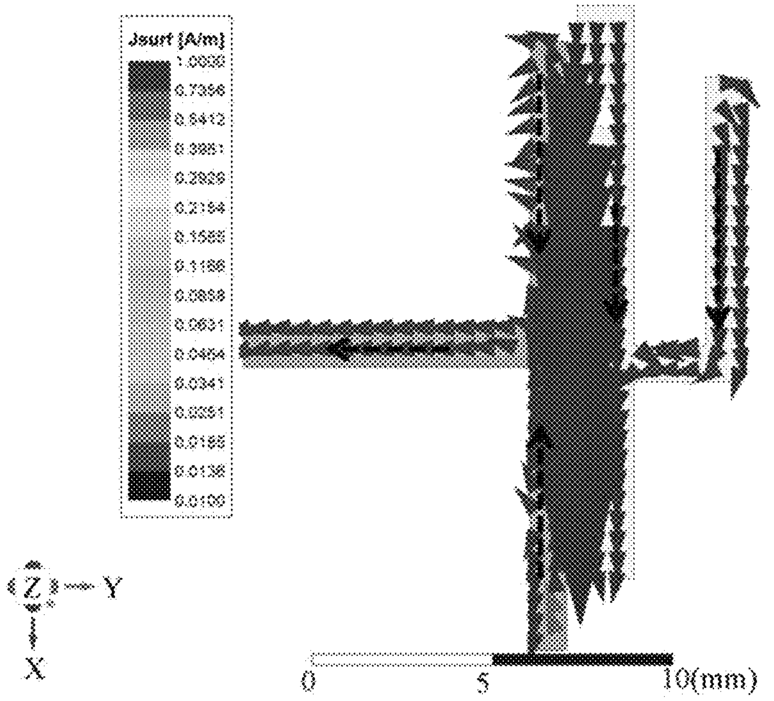

FIG. 25-1 shows a surface current (Jsurf) distribution diagram of the coupling probe PRB at the low-frequency radiation zero. Referring to FIG. 25-1, at the low-frequency radiation zero, the current directions on the first section PAA of the trunk line and the first branch line PB are opposite, and the energies cancel each other; the current directions on proximity coupling branch line form a closed loop, and the energies cancel each other. Therefore, very little energy is coupled to the radiating patch, and the radiating patch basically does not participate in radiation. In this way, the filtering antenna creates a low-frequency radiation zero.

FIG. 25-2 shows a surface current (Jsurf) distribution diagram of the coupling probe PRB at the high-frequency radiation zero. Referring to FIG. 25-2, at the high-frequency radiation zero, the current directions on the first section PAA of the trunk line and the first branch line PB are the same, and the intensity is maximum on the second section PAB of the trunk line. The current on proximity coupling branch line cannot completely cancel each other, but the current intensity is weak. Therefore, a large amount of energy on the microstrip line PRB1 can be coupled to the radiating patch. However, the induced current on the radiating patch is opposite, forming a high-frequency radiation zero.

Figure 26:
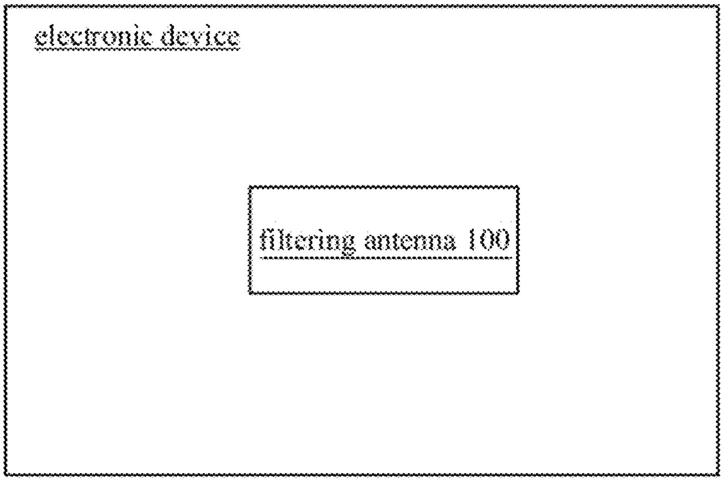
FIG. 26 is a schematic structural diagram of an electronic device in an implementation of the present disclosure.

An implementation of the present disclosure further provides an electronic device. Referring to FIG. 26, the electronic device may have any filtering antenna 100 described in the above implementations of the filtering antenna. In some examples, the electronic device is a 5G terminal, such as a tablet computer, a notebook computer, etc. In other examples, the electronic device may be a device with a tag antenna, and at least one tag antenna in the device employs the filtering antenna described in the above implementations of the filtering antenna. In this way, the electronic device can realize active or passive identification or reading. In other implementations, the electronic device is a wearable device, such as wearable clothes, hat, glasses, gloves, etc., so that the wearable device can implement body area network communication through the filtering antenna. Further, the filtering antenna may be disposed on a biocompatible material or a fabric material, or a part of the material of the filtering antenna may be made of a biocompatible material or a fabric material.

Other implementations of the present disclosure will be readily apparent to those skilled in the art from consideration of the specification and practice of the invention(s) disclosed herein. The present disclosure is intended to cover any variations, uses, or adaptations of the present disclosure that follow the general principles of the present disclosure and include common knowledge or customary technical means in the technical field that are not disclosed in the present disclosure. It is intended that the specification and examples should be considered as exemplary only, with a true scope and spirit of the present disclosure being indicated by the appended claims.

What is claimed is:

1. A filtering antenna, comprising:

a ground layer, a first dielectric layer, a second dielectric layer and a radiating patch that are stacked in sequence; and a coupling probe;

wherein the coupling probe comprises:

a microstrip line sandwiched between the first dielectric layer and the second dielectric layer; and a feeder that penetrates the first dielectric layer;

wherein the microstrip line comprises a trunk line extending along a first direction and an open-circuit branch line connected to the trunk line;

wherein the feeder is electrically connected to the trunk line;

wherein a distance between a feed center of the microstrip line and a first end of the trunk line is D1;

wherein a distance between an orthographic projection of the first end of the trunk line on the second dielectric layer and an orthographic projection of an edge of the radiating patch on the second dielectric layer is D4;

wherein 2.5≤D1/D4≤3.0.

2. The filtering antenna according to claim 1, wherein a width of the trunk line is greater than a width of the open-circuit branch line.

3. The filtering antenna according to claim 1, wherein the trunk line has a first axis of symmetry along the first direction, and the radiating patch has a second axis of symmetry along the first direction;

wherein an orthographic projection of the first axis of symmetry on the radiating patch coincides with the second axis of symmetry; or wherein the orthographic projection of the first end of the trunk line on the second dielectric layer is located within an orthographic projection of the radiating patch on the second dielectric layer; or wherein a distance between an orthographic projection of a second end of the trunk line on the second dielectric layer and an orthographic projection of an edge of the radiating patch on the second dielectric layer is D5;

wherein D4<D5.

4. The filtering antenna according to claim 1, wherein a radius of the feeder is 0.35~0.45 millimeters; and wherein the radiating patch is square and has a side length of 13~17 millimeters; and wherein a length of the trunk line is 15~17 millimeters.

5. The filtering antenna according to claim 1, wherein the open-circuit branch line comprises a first branch line extending along the first direction and a second branch line extending along the second direction, and the second direction is perpendicular to the first direction;

wherein a first end of the second branch line is connected to the trunk line, and a second end of the second branch line is connected to a first end of the first branch line, and a second end of the first branch line is located at a side of the second branch line close to the first end of the trunk line;

wherein a length of the trunk line is L1, and a length of the first branch line is L2;

wherein 2.0≤L1/L2≤2.4.

6. The filtering antenna according to claim 5, wherein the second branch line has a first edge of the second branch line and a second edge of the second branch line that are oppositely arranged;

wherein in the first direction, the first edge of the second branch line is located at a side of the second edge of the second branch line close to the feed center;

wherein a distance between the feed center and a straight line where the first edge of the second branch line is located is D3, and a distance between a second end of the trunk line and the straight line where the first edge of the second branch line is located is X1;

wherein D3 and X1 are equal.

7. The filtering antenna according to claim 5, wherein the second end of the first branch line is located between the feed center and the first end of the trunk line in the first direction.

8. The filtering antenna according to claim 7, wherein in the first direction, a distance between the feed center and the second end of the first branch line is D2;

wherein D2<D3.

9. The filtering antenna according to claim 5, wherein distance between the trunk line and the first branch line is X2;

wherein X2 is smaller than D1; or wherein the open-circuit branch line further comprises a third branch line;

wherein the third branch line and the first branch line extend in a same direction and are respectively arranged at both sides of the second branch line;

wherein a first end of the third branch line is connected to the second end of the second branch line;

wherein an orthographic projection of a second end of the third branch line on the second dielectric layer is located within an orthographic projection of the radiating patch on the second dielectric layer.

10. The filtering antenna according to claim 9, wherein a length of the third branch line is L2x;

wherein a distance between the orthographic projection of the second end of the third branch line on the second dielectric layer and the orthographic projection of an edge of the radiating patch on the second dielectric layer is X3;

wherein X3<L2x.

11. The filtering antenna according to claim 5, wherein the open-circuit branch line further comprises a fifth branch line extending along the second direction and a fourth branch line extending along the first direction;

wherein the fourth branch line and the first branch line are respectively located at both sides of the trunk line;

wherein a first end of the fifth branch line is connected to the trunk line, and a second end of the fifth branch line is connected to a first end of the fourth branch line;

wherein a second end of the fourth branch line is located at a side of the first end of the fourth branch line close to the feed center.

12. The filtering antenna according to claim 11, wherein a center line of the fifth branch line and a center line of the second branch line are located on a same straight line; or wherein a distance between the fourth branch line and the trunk line is X4, and a distance between the first branch line and the trunk line is X2;

wherein X2 and X4 are equal.

13. The filtering antenna according to claim 12, wherein a length of the first branch line is L2, and a length of the fourth branch line is L4;

wherein L4<L2.

14. The filtering antenna according to claim 5, wherein the open-circuit branch line further comprises a fifth branch line extending along the second direction and a fourth branch line extending along the first direction, and the four branch line and the first branch line are respectively located at both sides of the trunk line;

wherein a first end of the fifth branch line is connected to the trunk line, and a second end of the fifth branch line is connected to a first end of the fourth branch line;

wherein a second end of the fourth branch line is located at a side of the first end of the fourth branch line away from the feed center.

15. The filtering antenna according to claim 14, wherein a center line of the fifth branch line and a center line of the second branch line are located on a same straight line; or wherein a distance between the fourth branch line and the trunk line is X4, and a distance between the first branch line and the trunk line is X2;

wherein X2 and X4 are equal; or wherein an orthographic projection of the second end of the fourth branch line on the second dielectric layer is located within an orthographic projection of the radiating patch on the second dielectric layer, and a length of the fourth branch line is L4;

wherein a distance between the orthographic projection of the second end of the fourth branch line on the second dielectric layer and an orthographic projection of an edge of the radiating patch on the second dielectric layer is X5;

wherein X5<L4.

16. The filtering antenna according to claim 5, wherein the microstrip line further comprises a sixth branch line extending along the first direction, and the sixth branch line and the open-circuit branch line are respectively located at both sides of the trunk line.

17. The filtering antenna according to claim 16, wherein the sixth branch line has a first end and a second end;

wherein the first end of the sixth branch line is close to the first end of the trunk line, and the second end of the sixth branch line is close to the second end of the trunk line;

wherein in the first direction, a distance between the first end of the sixth branch line and the feed center is D6;

wherein D6<D1; or wherein a distance between the sixth branch line and the trunk line is D7;

wherein D7 is not larger than a radius of the feeder; or wherein a length of the sixth branch line is L6, and a length of the trunk line is L1;

wherein L6<L1; or wherein the microstrip line further comprises a seventh branch line extending along the second direction;

wherein a first end of the seventh branch line is connected to the sixth branch line, and an orthographic projection of a second end of the seventh branch line on the second dielectric layer is located outside an orthographic projection of the radiating patch on the second dielectric layer.

18. The filtering antenna according to claim 17, wherein the seventh branch line has a first edge and a second edge arranged oppositely;

wherein in the first direction, the first edge of the seventh branch line is located at a side of the second edge close to the feed center;

wherein the sixth branch line has a first end and a second end;

wherein the first end of the sixth branch line is close to the first end of the trunk line, and the second end of the sixth branch line is close to the second end of the trunk line;

wherein a distance between the first end of the sixth branch line and the first edge of the seventh branch line is X6, and a distance between the second end of the sixth branch line and the second edge of the lines is X7;

wherein X6 and X7 are equal.

19. The filtering antenna according to claim 17, wherein the sixth branch line has a first end and a second end;

wherein the first end of the sixth branch line is close to the first end of the trunk line, and the second end of the sixth branch line is close to the second end of the trunk line;

wherein an orthographic projection of the second end of the sixth branch line and an orthographic projection of the second end of the trunk line on the second dielectric layer are both located outside an orthographic projection of the radiating patch on the second dielectric layer;

wherein a distance between the orthographic projection of the second end of the sixth branch line on the second dielectric layer and an orthographic projection of an edge of the radiating patch on the second dielectric layer is D9;

wherein a distance between the orthographic projection of the second end of the trunk line on the second dielectric layer and the orthographic projection of the edge of the radiating patch on the second dielectric layer is D5;

wherein D9>D5.

20. An electronic device, comprising a filtering antenna; wherein the filtering antenna comprises:

a ground layer, a first dielectric layer, a second dielectric layer and a radiating patch that are stacked in sequence; and a coupling probe;

wherein the coupling probe comprises:

a microstrip line sandwiched between the first dielectric layer and the second dielectric layer; and a feeder that penetrates the first dielectric layer;

wherein the microstrip line comprises a trunk line extending along a first direction and an open-circuit branch line connected to the trunk line;

wherein the feeder is electrically connected to the trunk line;

wherein a distance between a feed center of the microstrip line and a first end of the trunk line is D1;

wherein a distance between an orthographic projection of the first end of the trunk line on the second dielectric layer and an orthographic projection of an edge of the radiating patch on the second dielectric layer is D4;

wherein $2.5 \leq D1/D4 \leq 3.0$.

* * * * *